(12) United States Patent
Eddy

(10) Patent No.: US 11,668,345 B1
(45) Date of Patent: Jun. 6, 2023

(54) SUPERHARD COMPACTS, ASSEMBLIES INCLUDING THE SAME, AND METHODS INCLUDING THE SAME

(71) Applicant: US SYNTHETIC CORPORATION, Orem, UT (US)

(72) Inventor: Brent Richard Eddy, Vineyard, UT (US)

(73) Assignee: US Synthetic Corporation, Orem, UT (US)

( * ) Notice: Subject to any disclaimer, the term of this patent is extended or adjusted under 35 U.S.C. 154(b) by 217 days.

(21) Appl. No.: 17/021,752

(22) Filed: Sep. 15, 2020

Related U.S. Application Data

(60) Provisional application No. 62/915,816, filed on Oct. 16, 2019.

(51) Int. Cl.
- F16C 33/04 (2006.01)
- E21B 10/567 (2006.01)
- C22C 29/00 (2006.01)

(52) U.S. Cl.
CPC .......... F16C 33/043 (2013.01); C22C 29/005 (2013.01); E21B 10/567 (2013.01); *B23B 2226/315* (2013.01); *F16C 2206/04* (2013.01)

(58) Field of Classification Search
None
See application file for complete search history.

(56) References Cited

U.S. PATENT DOCUMENTS

| | | | |
|---|---|---|---|
| 4,702,649 A * | 10/1987 | Komanduri | B23B 27/145 51/293 |
| 7,866,418 B2 | 1/2011 | Bertagnolli et al. | |
| 7,901,137 B1 | 3/2011 | Peterson | |
| 8,162,082 B1 * | 4/2012 | Gonzalez | E21B 10/567 175/428 |
| 9,695,642 B2 * | 7/2017 | Hay | E21B 47/0228 |
| 9,702,401 B2 | 7/2017 | Gonzalez | |
| 10,371,204 B2 | 8/2019 | Cooley et al. | |
| 2018/0147679 A1 | 5/2018 | Leal et al. | |

FOREIGN PATENT DOCUMENTS

| | | | |
|---|---|---|---|
| WO | WO-2004106003 A1 * | 12/2004 | B24D 18/00 |
| WO | WO-2015023953 A1 * | 2/2015 | E21B 10/23 |

OTHER PUBLICATIONS

U.S. Appl. No. 13/734,354, filed Jan. 4, 2013.
U.S. Appl. No. 61/948,970, filed Mar. 6, 2014.
U.S. Appl. No. 62/002,001, filed May 22, 2014.
U.S. Appl. No. 62/915,816, filed Oct. 16, 2019.

* cited by examiner

*Primary Examiner* — Pegah Parvini
*Assistant Examiner* — Ross J Christie
(74) *Attorney, Agent, or Firm* — PCFB LLC

(57) ABSTRACT

Superhard compacts, assemblies including the same, and methods of using the same are disclosed herein. An example assembly includes at least one superhard compact secured to a support body. The support body includes at least one exterior surface and defines at least one recess extending inwardly from the exterior surface. The recess is configured to receive at least a portion of the superhard compact. The assembly includes at least one magnet that secures the superhard compact to the support body. For example, the magnet may form part of the superhard compact, the support body, or both.

18 Claims, 17 Drawing Sheets

SUPERHARD COMPACTS, ASSEMBLIES INCLUDING THE SAME, AND METHODS INCLUDING THE SAME

CROSS-REFERENCE TO RELATED APPLICATIONS

This application claims priority to U.S. Provisional Application No. 62/915,816 filed on 16 Oct. 2019, the disclosure of which is incorporated herein, in its entirety, by this reference.

BACKGROUND

Wear-resistant, polycrystalline diamond compacts ('PDCs') are utilized in a variety of mechanical applications. For example, PDCs are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller-cone drill bits and fixed-cutter drill bits. A PDC cutting element typically includes a superabrasive diamond layer commonly known as a diamond table. The diamond table is formed and bonded to a substrate using a high-pressure/high-temperature ('HPHT') process. The PDC cutting element may be brazed directly into a preformed pocket, socket, or other receptacle formed in a bit body. The substrate may often be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented carbide substrate into a container or cartridge with a volume of diamond particles positioned on a surface of the cemented carbide substrate. A number of such cartridges may be loaded into an HPHT press. The substrate(s) and volume(s) of diamond particles are then processed under HPHT conditions in the presence of a catalyst material that causes the diamond particles to bond to one another to form a matrix of bonded diamond grains defining a polycrystalline diamond ('PCD') table. Cobalt is often used as the catalyst material for promoting intergrowth of the diamond particles.

In one conventional approach, a constituent of the cemented carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a catalyst to promote intergrowth between the diamond particles, which results in formation of a matrix of bonded diamond grains having diamond-to-diamond bonding therebetween, with interstitial regions between the bonded diamond grains being occupied by the solvent catalyst. Once the PCD table is formed, the solvent catalyst may be at least partially removed from the PCD table of the PDC by acid leaching.

Despite the availability of a number of different PCD materials, manufacturers and users of PCD materials continue to seek improved PDCs and methods of manufacturing the same.

SUMMARY

Embodiments disclosed herein are directed to superhard compacts, assemblies including the same, and methods of using the same. In an embodiment, a superhard compact for use in a support body is disclosed. The superhard compact includes a superhard table. The superhard table includes an upper surface, a table bottom surface opposite the upper surface, and at least one table lateral surface extending between the upper surface and the table bottom surface. The superhard compact also includes at least one magnet configured to attach to attach the superhard table to the support body.

In an embodiment, an assembly is disclosed. The assembly includes a support body including at least one exterior surface and defining at least one recess. The recess is defined by a recess bottom surface and at least one recess lateral surface extending between the recess bottom surface to the at least one exterior surface. The assembly also includes at least one superhard compact at least partially disposed in the at least one recess. The at least one superhard compact includes a superhard table. The superhard table includes an upper surface, a table bottom surface opposite the upper surface, and at least one table lateral surface extending between the upper surface and the table bottom surface. The support body, the at least one superhard compact, or both comprise the at least one magnet securing the at least one superhard compact to the support body.

In an embodiment, a method of forming an assembly. The method including disposing at least one superhard compact in at least one recess defined by a support body. The at least one recess is defined by a recess bottom surface and at least one recess lateral surface extending from the recess bottom surface to at least one exterior surface of the support body. The at least one superhard compact includes a superhard table including a table upper surface, a table bottom surface opposite the upper surface, and at least one table lateral surface extending between the table upper surface and the table bottom surface. The method also includes magnetically securing the at least one superhard compact to the support body. The support body, the at least one superhard compact, or both comprise at least one magnet.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical or similar elements or features in different views or embodiments shown in the drawings.

DETAILED DESCRIPTION

Figure 1A:
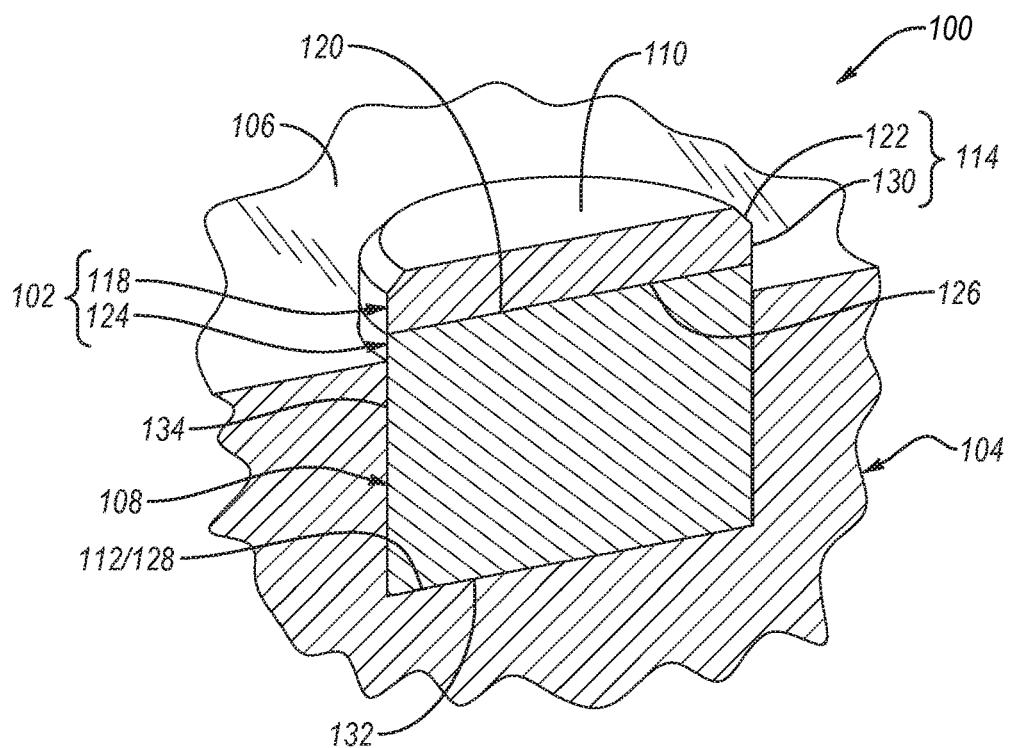
FIGS. 1A and 1B are a partial cross-sectional view and an exploded partial cross-sectional view of a portion of an assembly, according to an embodiment.
Figure 1B:
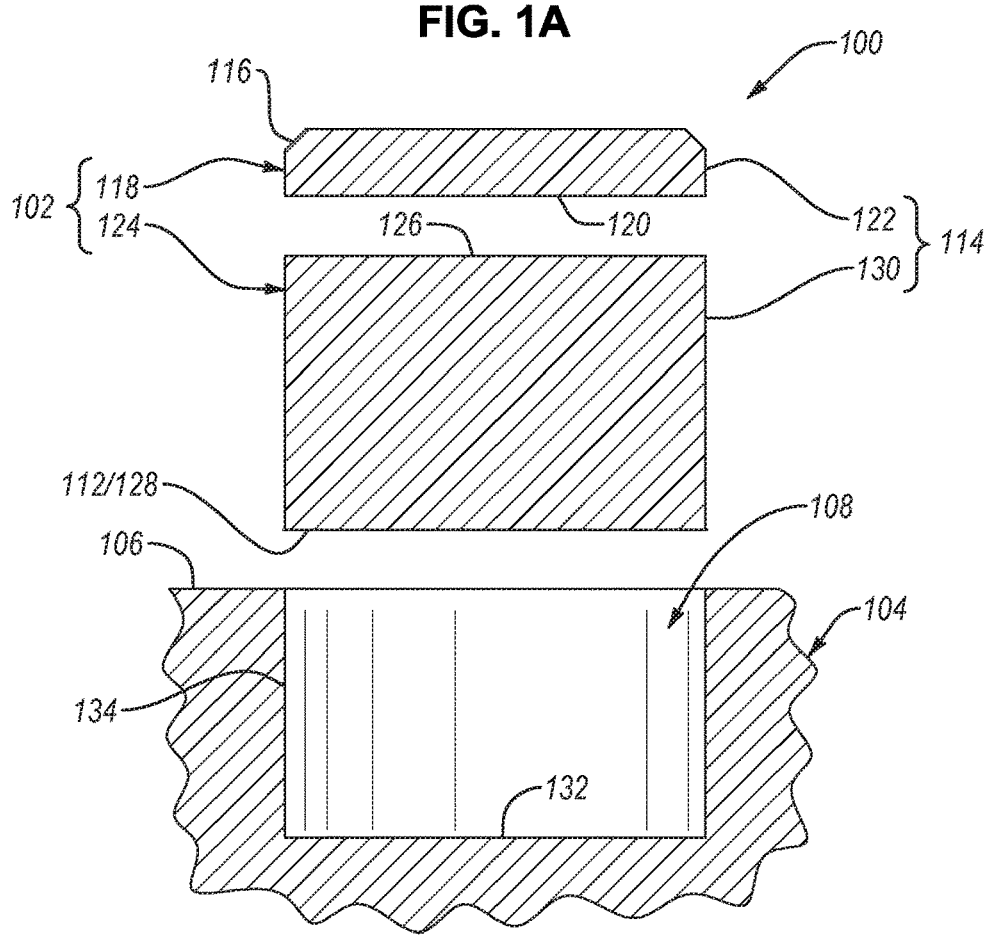

Embodiments disclosed herein are directed to superhard compacts, assemblies including the same, and methods of using the same. FIGS. 1A and 1B are a partial cross-sectional view and an exploded partial cross-sectional view of a portion of an assembly 100, according to an embodiment. The assembly 100 includes at least one superhard compact 102 secured to a support body 104. The superhard compact 102 and the support body 104 may be the same or substantially similar to any of the superhard compacts and support bodies, respectively, discussed herein. The support body 104 includes at least one exterior surface 106 and defines at least one recess 108 extending inwardly from the exterior surface 106. The recess 108 is configured to receive at least a portion of the superhard compact 102. The assembly 100 includes at least one magnet (not shown in FIG. 1A or 1B but shown in FIGS. 2A-6B and 8-11) that secures the superhard compact 102 to the support body 104. For example, a magnet may form part of the superhard compact 102, the support body 104, or both. In an embodiment, the at least one magnet forms part of the superhard compact 102 and/or the support body 104 when the magnet is attached to, disposed in, or incorporated into the rest of the superhard compact 102 and/or the support body 104. A magnet may comprise one or more magnetic materials, an electromagnet, or combinations of the foregoing.

The superhard compact 102 defines an upper surface 110. In an example, the upper surface 110 may be a cutting surface when the superhard compact 102 is used in a drilling embodiment or a bearing surface when the superhard compact 102 using in a bearing embodiment. The upper surface 110 may be substantially planar (as shown) or may be non-planar (e.g., convexly curved, concavely curved, define one or more recesses, etc.). As discussed in more detail below, the upper surface 110 of the superhard compact 102 is formed from a superhard material. The superhard compact 102 may also include a bottom surface 112 opposite the upper surface 110. The bottom surface 112 may be planar (as illustrated) or non-planar. The superhard compact 102 may further include at least one lateral surface 114 extending at least partially between the upper surface 110 and the bottom surface 112. The superhard compact 102 may additionally include a chamfer 116 extending between the upper surface 110 and the lateral surface 114 and a chamfer (not shown) extending between the bottom surface 112 and the lateral surface 114.

The superhard compact 102 includes a superhard table 118. The superhard table 118 includes at least one superhard material and defines the upper surface 110 of the superhard compact 102. The superhard table 118 also includes a table bottom surface 120 opposite the upper surface 110. The table bottom surface 120 may be planar (as shown) or nonplanar. The superhard table 118 further includes at least one table lateral surface 122 extending at least partially between the upper surface 110 and the table bottom surface 120. In an embodiment (as shown), the superhard compact 102 also includes a substrate 124 attached (e.g., bonded) to the superhard table 118. For example, the substrate 124 may include a substrate upper surface 126 directly attached to the table bottom surface 120. The substrate upper surface 126 may be attached to the table bottom surface 120 using any suitable attachment technique, such as with a metallurgical bond or via brazing. The substrate upper surface 126 corresponds to the table bottom surface 120 to facilitate the attachment between the table bottom surface 120 and the substrate upper surface 126. The substrate 124 may also include a substrate bottom surface 128 opposite the substrate upper surface 126, and at least one substrate lateral surface 130 at least partially extending between the substrate upper surface 126 and the substrate bottom surface 128. When the superhard compact 102 includes the superhard table 118 and the substrate 124 (and depending on the location of the magnet, as discussed in more detail below), the substrate bottom surface 128 may form the bottom surface 112 of the superhard compact 102 and the table lateral surface 122 and the substrate lateral surface 130 collectively form at least a portion of the lateral surface 114 of the superhard compact 102. In an embodiment (not shown), the substrate 124 is omitted from the superhard compact 102. In such an embodiment and depending on the location of the magnet, the table bottom surface 120 may form the bottom surface 112 of the superhard compact 102 and the table lateral surface 122 may form at least a portion of the lateral surface 114 of the superhard compact 102.

The superhard compact 102 includes at least one superhard material. For example, the upper surface 110 of the superhard compact 102 may be defined by a superhard material and/or the superhard table 118 may be formed from a superhard material. The term "superhard" means a material having a hardness at least equal to the hardness of tungsten carbide. In an embodiment, the superhard material may include polycrystalline cubic boron nitride, polycrystalline diamond (e.g., formed by chemical vapor deposition or by HPHT sintering), silicon carbide, silicon nitride, tantalum carbide, tungsten carbide (e.g., binderless tungsten carbide, cobalt-cemented tungsten carbide), boron carbide, other metal carbides, other superhard ceramic carbides, or combinations thereof. In an embodiment, the superhard material may include a superhard coating applied to a superhard or non-superhard material.

In an embodiment, the superhard compact 102 may comprise a polycrystalline diamond compact ("PDC") including a polycrystalline diamond ("PCD") table defining the superhard table 118 to which the substrate 124 is bonded. For example, the substrate 124 may comprise a cobalt-cemented tungsten carbide substrate bonded to a PCD table. The PCD table includes a plurality of directly bonded-together diamond grains exhibiting diamond-to-diamond bonding therebetween (e.g., sp3 bonding), which define a plurality of interstitial regions. A portion of, or substantially all of, the interstitial regions of the PCD table may include a metal-solvent catalyst or a metallic infiltrant disposed therein that is infiltrated from the substrate 124 or from another source during fabrication. For example, the metal-solvent catalyst or metallic infiltrant may be selected from iron, nickel, cobalt, and alloys of the foregoing. The PCD table may further including thermally-stable diamond in which the metal-solvent catalyst or metallic infiltrant has been partially or substantially completely depleted from a selected surface or volume of the PCD table, for example via an acid leaching process. Thermally-stable PCD may also be sintered with one or more alkali metal catalysts.

In an embodiment, the PDC including a PCD table bonded to a substrate 124 may be formed in an HPHT process. For example, diamond particles may be disposed adjacent to the substrate 124, and subjected to an HPHT process to sinter the diamond particles to form the PCD table and bond the PCD table to the substrate 124, thereby forming the PDC. The temperature of the HPHT process may be at least about 1000° C. (e.g., about 1200° C. to about 1600° C.) and the cell pressure of the HPHT process may be at least about 4.0 GPa (e.g., about 5.0 GPa to about 12 GPa or about 7.5 GPa to about 11 GPa) for a time sufficient to sinter the diamond particles. Further examples of the HPHT processes, which may be employed in any embodiment disclosed herein, are disclosed in U.S. Pat. No. 7,866,418, the disclosure of which is incorporated herein, in its entirety, by this reference.

The diamond particles may exhibit an average particle size of about 50 µm or less, such as about 30 µm or less, about 20 µm or less, about 10 µm to about 18 µm, or about 15 µm to about 18 µm. In some embodiments, the average particle size of the diamond particles may be about 10 µm or less, such as about 2 µm to about 5 µm or submicron. In some embodiments, the diamond particles may comprise a relatively larger size and at least one relatively smaller size. As used herein, the phrases "relatively larger" and "relatively smaller" refer to particle sizes (by any suitable method) that differ by at least a factor of two (e.g., 30 µm and 15 µm). According to various embodiments, the mass of diamond particles may include a portion exhibiting a relatively larger size (e.g., 30 µm, 20 µm, 15 µm, 12 µm, 10 µm, 8 µm) and another portion exhibiting at least one relatively smaller size (e.g., 6 µm, 5 µm, 4 µm, 3 µm, 2 µm, 1 µm, 0.5 µm, less than 0.5 µm, 0.1 µm, less than 0.1 µm). In one embodiment, the diamond particles may include a portion exhibiting a relatively larger size between about 10 µm and about 40 µm and another portion exhibiting a relatively smaller size between about 1 µm and 4 µm. In some embodiments, the diamond particles may comprise three or more different sizes (e.g., one relatively larger size and two or more relatively smaller sizes), without limitation. The PCD table so-formed after sintering may exhibit an average diamond grain size that is the same or similar to any of the foregoing diamond particle sizes and distributions. More details about diamond particle sizes and diamond particle size distributions that may be employed are disclosed in U.S. patent application Ser. No. 13/734,354; U.S. Provisional Patent Application No. 61/948,970; and U.S. Provisional Patent Application No. 62/002,001. The disclosure of each of U.S. patent application Ser. No. 13/734,354; U.S. Provisional Patent Application No. 61/948,970; and U.S. Provisional Patent Application No. 62/002,001 is incorporated herein, in its entirety, by this reference.

In an embodiment, the superhard table 118 may be integrally formed with the substrate 124. For example, superhard table 118 may be a sintered PCD table that is integrally formed with the substrate 124. In another embodiment, the superhard table 118 may be a pre-formed superhard table that has been HPHT bonded to the substrate 124 in a second HPHT process after being initially formed in a first HPHT process. For example, the superhard table 118 may be a pre-formed PCD table that has been leached to substantially completely remove the metal-solvent catalyst used in the manufacture thereof and subsequently HPHT bonded or brazed to the substrate 124 in a separate process.

In some embodiments, the superhard table 118 may be leached to deplete a metal-solvent catalyst or a metallic infiltrant therefrom in order to enhance the thermal stability of the superhard table 118. For example, when the superhard table 118 is a PCD table, the superhard table 118 may be leached to remove at least a portion of the metal-solvent catalyst from a working region thereof to a selected depth to form a leached thermally-stable region. The leached thermally-stable region may extend inwardly from the upper surface 110 to a selected depth. In an embodiment, the depth of the thermally-stable region may be about 10 µm to about 1500 µm. More specifically, in some embodiments, the selected depth is about 50 µm to about 100 µm, about 100 µm to about 1000 µm, about 600 µm to about 1500 µm, or about 800 µm to about 1500 µm. The leaching may be performed in a suitable acid, such as aqua regia, nitric acid, hydrofluoric acid, or mixtures of the foregoing.

The substrate 124 may be formed from any number of different materials, and may be integrally formed with, or otherwise bonded or connected to, the superhard table 118. Materials suitable for the substrate 124 may include, without limitation, cemented carbides, such as tungsten carbide, titanium carbide, chromium carbide, niobium carbide, tantalum carbide, vanadium carbide, or combinations thereof cemented with iron, nickel, cobalt, or alloys thereof. For example, in an embodiment, the substrate 124 comprises cobalt-cemented tungsten carbide. In an embodiment, the substrate 124 may include a ferromagnetic material, such a carbide cemented with a cobalt, nickel, or iron.

The support body 104 may include any device that can support the superhard compact 102 during operation. In an embodiment, the support body 104 may be at least a portion of a drill bit (e.g., the blades of a drill bit), as discussed in more detail below. In an embodiment, the support body 104 is a support ring of a bearing assembly, as discussed in more detail below.

As previously discussed, the support body 104 includes at least one exterior surface 106 and at least one recess 108 extending inwardly from the exterior surface 106. The recess 108 is configured to receive at least a portion of the superhard compact 102 therein. For example, the recess 108 may be defined by a recess bottom surface 132 that is spaced from the exterior surface 106. The recess bottom surface 132 may be spaced from the exterior surfaced 106 that is equal to or greater than a length of the superhard compact 102 measured from the upper surface 110 to the bottom surface 112 thereof which allows the upper surface 110 of the superhard compact 102 to be in plane with or, more preferably, positioned above the exterior surface 106. The recess 108 is also defined by at least one recess lateral surface 134 extending between the exterior surface 106 and the recess bottom surface 132. The recess lateral surface 134 may exhibit a shape and/or size that generally corresponds to the lateral surface 114 of the superhard compact 102 which allows the recess 108 to receive the superhard compact 102.

The support body 104 may be formed from any suitable material. For example, the support body 104 may be formed from steel (e.g., carbon steel, stainless steel, etc.), tungsten carbide, or any other suitable material. In an embodiment, the support body 104 may be formed from a ferromagnetic material, such as carbon steel or cobalt-cemented tungsten carbide. The ferromagnetic material may facilitate attachment of the superhard compact 102 to the support body 104 when the superhard compact 102 includes at least one magnet.

As previously discussed, the assembly 100 includes at least one magnet (not shown in FIGS. 1A and 1B but shown in FIGS. 2A to 6B and 8-11) that is secures the superhard compact 102 to the support body 104. The magnet may facilitate repair of the assembly 100 compared to conventional attachment techniques that are used to secure the superhard compact 102 to the support body 104. In an embodiment, conventional assemblies are provided with a plurality of superhard compacts secured to a support body. During operation, at least one of the superhard compacts may wear or fail such that rotation or replacement of the superhard compact is required. For example, a superhard compact used in a drilling operation may have a cutting surface that wears or otherwise fails while other surfaces of the superhard compact may not have significant wear or failure. In such an example, rotating the superhard compact such that other surfaces of the superhard compact form the cutting surface may increase the life span of and decrease the cost of using the superhard compact. However, conventional techniques of securing the superhard compacts to the support body prevent the rotation and/or replacement of the superhard compacts in the field (e.g., outside of a repair center). For example, securing, rotating, or removing a superhard compact that is brazed or press-fitted to the support body may require heating the support body to melt the braze or loosen the press-fit. Heating the support body may be difficult, especially when the superhard compact includes polycrystalline diamond because heating the polycrystalline diamond to temperatures greater than 700° C. may degrade the polycrystalline diamond. Thus, the entire assembly is typically sent to the repair center to rotate and/or remove the superhard compact, even when just one or a few superhard compacts need to be rotated or replaced. Sending the entire assembly to the repair center includes several logistical issues, including the need to ship the assembly, increasing the time during which the assembly cannot be used, requiring replacement assemblies, and/or otherwise increasing the cost of using the assembly.

However, referring back to FIGS. 1A and 1B, using at least one magnet to secure the superhard compact 102 to the support body 104 may resolve at least some of the problems associated with conventional techniques of securing the superhard compacts to the support body. For example, a magnet may not require heating the assembly 100 to rotate, detach, or attach the superhard compact 102 to the support body 104 which may allow the assembly 100 to be assembled and/or repaired (e.g., the superhard compacts 102 rotated or replaced) in the field instead of in a repair center. Maintaining the assembly 100 in the field may eliminate many of the logistical issues discussed above. Further, using at least one magnet to secure the superhard compact 102 to the support body 104 may eliminate other problems associated with conventional techniques of securing the superhard compact 102 to the support body 104, such as liquid metal embrittlement caused by brazing, the formation of microcracks formed by press-fitting, or the risk of degradation of the polycrystalline diamond caused by overheating the superhard compact 102 during brazing and/or press-fitting.

As discussed in more detail below, at least one magnet that secures the superhard compact 102 to the support body 104 may be attached to of at least one of the superhard compact 102 (as shown in FIGS. 2A to 7B) or the support body 104 (as shown in FIGS. 8 to 12). In an embodiment, at least one magnet is attached only to the superhard compact 102. In such an embodiment, the support body 104 includes a ferromagnetic material which forms at least one magnet to secure the superhard compact 102 to the support body 104. In an embodiment, the magnet only forms part of the support body 104. In such an embodiment, the superhard compact 102 may include a ferromagnetic material (e.g., the metal-solvent catalyst) which forms at least one magnet to secure the superhard compact 102 to the support body 104. In an embodiment, at least one magnet is attached to the superhard compact 102 and at least one other magnet is attached to the support body 104. In such an embodiment, the magnet attached to the superhard compact 102 is positioned such that a "north" or "south" pole of such magnet is adjacent to or contacting a "south" or "north" pole of the magnet attached to the support body 104, respectively.

In an embodiment, any magnet disclosed herein may include any suitable permanent magnet. For example, a permanent magnet may include an iron-based permanent magnet (e.g., magnetite or lodestone), a cobalt-based permanent magnet, a nickel-based permanent magnetic, a gadolinium-based permanent magnet, a holmium-based permanent magnet, a ceramic permanent magnet (e.g., ferrite or Alnico), a rare-earth based magnet such as a neodymium-based permanent magnet (e.g., $Nd_2Fe_{14}B$) or a samarium-based permanent magnet (e.g., a samarium-cobalt permanent magnet), or any other suitable magnet. Further examples of permanent magnets, which may be employed in any embodiment disclosed herein, are disclosed in U.S. Patent Application Publication No. 2018/0147679 filed on Nov. 28, 2016, the disclosure of which is incorporated herein, in its entirety, by this reference. Generally, since at least one magnet secures the superhard compact to the support body, such at least one magnet may be a rare-earth permanent magnet or other permanent magnet exhibiting a high at least one of magnetic flux density (e.g., residual magnetism), magnetic coercivity, energy product, Curie temperature, or pull force (a.k.a., pounds pull, breakaway force, or pull strength) measured using any suitable technique.

In an example, a permanent magnet may exhibit a magnetic flux density, which is related to the strength of the permanent magnet, that is greater than about 0.35 Tesla ("T"), greater than about 0.5 T, greater than about 0.6 T, greater than about 0.7 T, greater than about 0.8 T, greater than about 0.9 T, greater than about 1 T, greater than about 1.1 T, greater than about 1.2 T, greater than about 1.3 T, greater than about 1.4 T, or in ranges of about 0.35 T to about 0.6 T, about 0.5 T to about 0.7 T, about 0.6 T to about 0.8 T, about 0.7 T to about 0.9 T, about 0.8 T to about 1 T, about 0.09 T to about 1.1 T, about 1 T to about 1.2 T, about 1.1 T to about 1.3 T, or about 1.2 T to about 1.4 T. Increasing the magnetic flux density of the permanent magnet increases the attachment force between the superhard compact 102 and the support body 104. However, increasing the magnetic flux density of the permanent magnet may make rotating or replacing the superhard compact 102 more difficult without demagnetizing the permanent magnet, which may be difficult to perform in the field. As such, the magnetic flux density may be selected based, at least in part, on the required attachment force to adequately secure the superhard compact 102 to the support body 104 while also facilitating rotation and/or replacement of the superhard compact 102.

In an example, a permanent magnet may exhibit a selected magnetic coercivity, which related to the ability of the magnet to resist demagnetization during use, that is greater than about 200 kA/m, greater than about 400 kA/m, greater than about 600 kA/m, greater than about 800 kA/m, greater than about 1000 kA/m, greater than about 1250 kA/m, greater than about 1500 kA/m, greater than about 1750 kA/m, greater than about 200 kA/m, or in ranges of about 200 kA/m to about 600 kA/m, about 400 kA/m to about 800 kA/m, about 600 kA/m to about 1000 kA/m, about 800 kA/m to about 1250 kA/m, about 1000 kA/m to about 1500 kA/m, about 1250 kA/m to about 1750 kA/m, or about 1500 kA/m to about 2000 kA/m. The ability of the magnet to resist demagnetization during use may be important because the magnet may be subjected to repetitive loading and/or increased temperature, which may decrease the magnetic properties of the magnet and, by extension, decrease the attachment force that secures the superhard compact 102 to the support body 104. However, as previously discussed, the magnet may need to be demagnetized to facilitate rotation and/or replacement of the superhard compact 102. Decreasing the magnetic coercivity may facilitate demagnetization and subsequent magnetization of the magnet during rotation and/or replacement of the superhard compact 102.

In an example, a permanent magnet may exhibit a selected energy product ($BH_{Max}$), which is related to the strength of the permanent magnet, that is greater than about 25 kJ/m$^3$, greater than about 50 kJ/m$^3$, greater than about 75 kJ/m$^3$, greater than about 100 kJ/m$^3$, greater than about 150 kJ/m$^3$, greater than about 200 kJ/m$^3$, greater than about 300 kJ/m$^3$, greater than about 400 kJ/m$^3$, or in ranges of about 25 kJ/m$^3$ to about 75 kJ/m$^3$, about 50 kJ/m$^3$ to about 100 kJ/m$^3$, about 75 kJ/m$^3$ to about 150 kJ/m$^3$, about 100 kJ/m$^3$ to about 200 kJ/m$^3$, about 150 kJ/m$^3$ to about 300 kJ/m$^3$, or about 200 kJ/m$^3$ to about 400 kJ/m$^3$. Similar to the magnetic flux density, the energy product of a magnet may be selected to ensure that an adequate attachment force secures the superhard compact 102 to the support body 104 and/or to ensure that the superhard compact 102 is rotatable and/or replaceable in the field.

In an example, a permanent magnet may exhibit a selected Curie temperature, which is the temperature at which the permanent magnet may demagnetize, that is greater than the operation temperature of the superhard compact. The Curie temperature may be greater than about 400° C., greater than about 500° C., greater than about 600° C., greater than about 700° C., greater than about 800° C., or in ranges of about 400° C. to about 600° C., about 500° C. to about 700° C., about 600° C. to about 800° C., or about 700° C. to about 900° C.

In an example, the permanent magnet may exhibit a selected pull force, which is the force required to pull the magnet from a planar surface of a carbon steel plate that is significantly larger than the magnet in a direction that is perpendicular to the planar surface, may be greater than about 5 Newtons ("N"), greater than about 10 N, greater than about 25 N, greater than about 50 N, greater than about 75 N, greater than about 100 N, greater than about 150 N, greater than about 200 N, greater than about 300 N, greater than about 400 N, greater than about 500 N, greater than about 600 N, greater than about 800 N, greater than about 1 kN, greater than 1.5 kN, greater than 2 kN, or in ranges of about 10 N to about 50 N, about 25 N to about 75 N, about 50 N to about 100 N, about 75 N to about 150 N, about 100 N to about 200 N, about 150 N to about 300 N, about 200 N to about 400 N, about 300 N to about 500 N, about 400 N to about 600 N, about 500 N to about 800 N, about 600 N to about 1 kN, about 800 N to about 1.5 kN, or about 1 kN to about 2 kN. The pull force is directly related to the attachment force that secures the superhard compact 102 to the support body 104. As such, similar to the magnetic flux density, the pull force of the magnet may be selected to ensure that an adequate attachment force secures the superhard compact 102 to the support body 104 and/or to ensure that the superhard compact 102 is rotatable and/or replaceable in the field. It is noted that the pull force may depend on the residual magnetism, the energy product, and the volume (e.g., diameter) of the permanent magnet.

In an embodiment, the magnet may be an electromagnet. The electromagnet includes at least one electrical conductor (e.g., wire) surrounding, optionally, a magnetic core. The electromagnet is connected to an electric source, such as an electric source (e.g., a generator) that provides power to one or more systems of the assembly (e.g., drill bit). The electric source may be configured to provided electrical current through the electrical conductor which produces the magnetic field of the electromagnet. The electrical current may be selected such that the electromagnet exhibits any of the magnetic properties (e.g., magnetic flux density, magnetic coercivity, energy product, and/or pull force) discussed above with regards to the permanent magnet.

Whether the magnet includes a permanent magnet, an electromagnet, or a combination thereof may depend on the embodiment in which the magnet is used. In an example, the magnet may be a permanent magnet when is it difficult, impossible, or impractical to supply electrical current to the magnet or when conservation of electrical energy is beneficial. In an example, the magnet may at least partially comprise an electromagnet to facilitate rotation and/or replacement of a superhard compact 102.

The magnet may exhibit a selected size and/or shape that is configured to be at least partially attached to, disposed in, or incorporated into the superhard compact 102 and/or the support body 104, as will be discussed in more detail below. In an example, when the magnet includes a permanent magnet, the size and shape of the magnet may correspond to the size and shape of the permanent magnet itself or the size and shape of any coating or protective housing that covers at least a portion of the permanent magnet. In an example, when the magnet includes an electromagnet, the size and shape of the magnet may correspond to the shape and volume of the electrical conductors with the optional core or the size and shape of a housing that encloses the electrical conductor with the optional core disposed therein.

During operation of the assembly 100, forces may be applied to the superhard compact 102 and the support body 104. The superhard compact 102 and the support body 104 may be formed from materials that exhibit a strength (e.g., yield strength or ultimate tensile strength) and/or toughness (e.g., fracture toughness) that is sufficient to prevent failure of the superhard compact 102 and the support body 104 when the additional force is applied thereto. However, the magnet may have a strength and/or toughness that is less than the superhard compact 102 and the support body 104 due to limitations in the materials that may form the magnet which may cause the magnet to fail when the additional loads are applied thereto. To avoid failure of the magnet, the assembly 100 may be configured such that a gap is present between the magnet and whichever of the superhard compact 102 or the support body 104 that surrounds the magnet. The gap may prevent failure of the magnet, since loads cannot be transferred to the magnet through the gap. When the magnet forms part of the superhard compact 102, the gap may be formed by at least one of axially (e.g., relative to an axis of the superhard compact 102) offsetting the magnet relative to the bottom surface 112 of the superhard compact 102, laterally offsetting the magnet relative to the lateral surface 114 of the superhard compact 102, or causing a surface of the recess 108 adjacent to the magnet to bulge or deform away from the magnet. When the magnet forms part of the support body 104, the gap may be formed by at least one of axially offsetting the magnet relative to the recess bottom surface 132, laterally offsetting the magnet relative to the recess lateral surface 134, or causing a surface of the superhard compact 102 adjacent to the magnet to bulge or deform away from the magnet.

In an embodiment, the axial and/or lateral offset discussed above may be about 5 µm to 5 mm, such as in ranges of about 5 µm to about 50 µm, about 25 µm to about 75 µm, about 50 µm to about 100 µm, about 75 µm to about 150 µm, about 100 µm to about 200 µm, about 150 µm to about 300 µm, about 200 µm to about 400 µm, about 300 µm to about 500 µm, about 400 µm to about 700 µm, about 600 µm to about 1 mm, about 800 µm to about 1.2 mm, about 1 mm to about 1.5 mm, about 1.25 mm to about 1.75 mm, about 1.5 mm to about 2 mm, about 1.75 mm to about 2.5 mm, about 2 mm to about 3 mm, about 2.5 mm to about 4 mm, or about 3 mm to about 5 mm. In an example, the axial and/or lateral offset may be selected based on the modulus of elasticity (i.e., Young's modulus) of the superhard compact or support body about the magnet since increasing the stiffness of the superhard compact or the support body may allow for smaller axial and/or lateral offset. In an example, the axial and/or lateral offset may be selected based on the strength (e.g., the yield strength or the ultimate tensile strength) of the superhard compact or the support body about the magnet. In such an example, increasing the strength of the superhard compact or the support body may allow for larger deflections of the superhard compact or the support body before failure thus requiring the axial and/or lateral offset to likewise be increased. In an example, the axial and/or lateral offset may be selected based on the desired attachment between the superhard compact and the support body since increasing the axial and/or lateral offset may interfere with the attachment between the superhard compact and the support body.

Figure 2A:
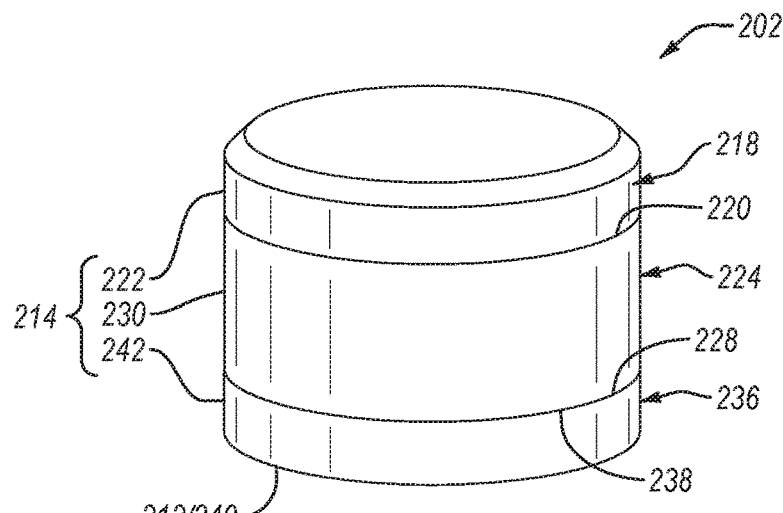
FIGS. 2A and 2B are an isometric and an exploded isometric view of a superhard compact, according to an embodiment.
Figure 2B:
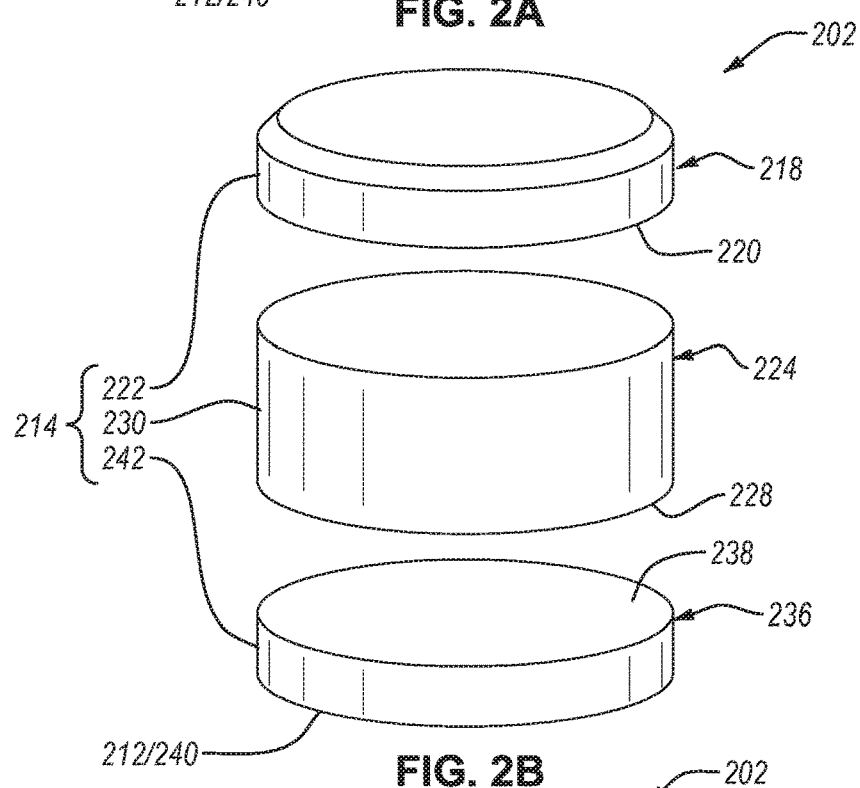
Figure 2C:
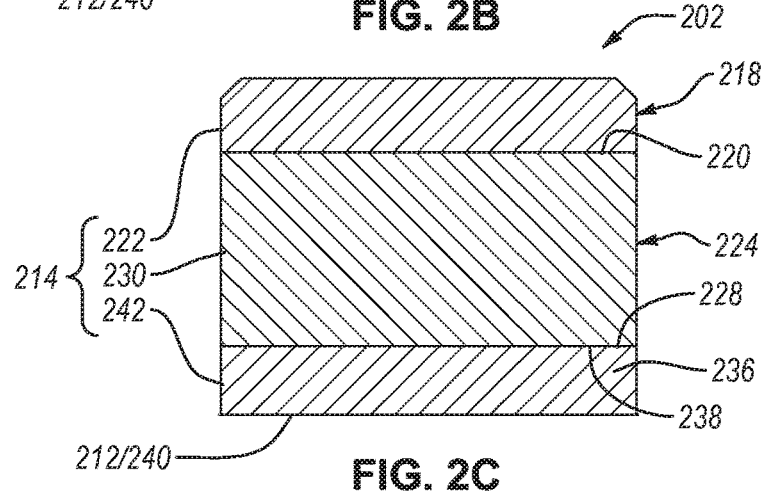
FIG. 2C is a cross-sectional view of the superhard compact shown in FIGS. 2A and 2B taken along line 2C-2C, according to an embodiment.

FIGS. 2A and 2B are an isometric and an exploded isometric view of a superhard compact 202, according to an embodiment. FIG. 2C is a cross-sectional view of the superhard compact 202 shown in FIGS. 2A and 2B taken along line 2C-2C, according to an embodiment. Except as otherwise disclosed herein, the superhard compact 202 may be the same or substantially similar to any of the superhard compacts disclosed herein. For example, the superhard compact 202 includes a superhard table 218 and, optionally, a substrate 224.

The superhard compact 202 includes at least one magnet 236 attached, either directly or indirectly, to the superhard table 218. The magnet 236 defines a magnet upper surface 238. In an embodiment, as illustrated, the magnet 236 is indirectly attached to the superhard table 218 via the substrate 224. In such an embodiment, the magnet upper surface 238 may be attached to the substrate bottom surface 228. The magnet upper surface 238 may be attached to the substrate bottom surface 228 using any suitable attachment technique, such as via brazing or a metallurgical bond. As shown, the magnet upper surface 238 may exhibit a shape (e.g., topography) that corresponds to the shape of the substrate bottom surface 228. For example, the magnet upper surface 238 may be substantially planar when the substrate bottom surface 228 is substantially planar or the magnet upper surface 238 may be nonplanar when the substrate bottom surface 228 is nonplanar. In an embodiment, when the substrate 224 may be omitted from the superhard compact 202 and the magnet 236 may be attached directly to the superhard table 218. In such an embodiment, the magnet upper surface 238 may be attached to the table bottom surface 220. The magnet upper surface 238 may be attached to the table bottom surface 220 using any suitable attachment technique, such as via brazing or a metallurgical bond. Optionally, the magnet upper surface 238 may exhibit a shape that corresponds to the shape of the table bottom surface 220. For example, the magnet upper surface 238 may be substantially planar when the table bottom surface 220 is substantially planar or the magnet upper surface 238 may be nonplanar when the table bottom surface 220 is nonplanar.

The magnet 236 may also defined by a magnet bottom surface 240 opposite the magnet upper surface 238. In the illustrated embodiment, the magnet bottom surface 240 forms the bottom surface 212 of the superhard compact 202. As such, the magnet bottom surface 240 may be configured to contact the recess bottom surface (not shown). In an embodiment, the magnet bottom surface 240 may exhibit a shape (e.g., topography) that corresponds to the shape of the recess bottom surface to facilitate load distribution. In an embodiment, the magnet bottom surface 240 may be formed from a compliant material (e.g., polymeric protective coating) to facilitate load distribution.

The magnet 236 may also be defined by at least one magnet lateral surface 242 that extends between the magnet upper surface 238 and the magnet bottom surface 240. In an embodiment, the magnet lateral surface 242 also forms part of the lateral surface 214 of the superhard compact 200. As shown, the magnet lateral surface 242 may form part of the lateral surface 214 when the magnet lateral surface 242 is aligned with the table lateral surface 222 and/or the substrate lateral surface 230. In other words, the magnet lateral surface 242 may form part of the lateral surface 244 when a lateral dimension of the magnet 236 measured between the magnet lateral surface 242 is substantially the same as a lateral dimension measured of the superhard table 218 and/or the substrate 224. The lateral dimension of the superhard table 218 and/or the substrate 224 is measured parallel to the lateral dimension of the magnet 236 between the table lateral surface 222 and/or the substrate lateral surface 230, respectively. In an embodiment, the magnet lateral surface 242 may be laterally offset inwardly relative to the lateral surface 214 of the superhard compact 202 to form a gap between the magnet lateral surface 242 and a corresponding surface of the recess. The magnet lateral surface 242 may be laterally offset inwardly relative to the lateral surface 214 when the lateral dimension of the magnet 236 is less than a lateral dimension of the superhard table 218 and/or the substrate 224.

In an embodiment, the magnet 236 may be attached to the superhard compact 202 before, during, or after the HPHT process that formed the superhard compact 202. In an embodiment, the magnet 236 may be disposed in the container that includes the diamond particles and, optionally, the substrate 224 to form an HPTH assembly before the HPTH assembly is subjected to the HPHT process. The magnet 236 may then be attached to the superhard compact 202 during the HPHT process. For example, the HPHT process may be used to melt a braze that is used to attach the magnet 236 to the superhard compact 202 or the infiltrant (e.g., metal-solvent catalyst) that infiltrates the diamond grams may also infiltrate the magnet 236 thereby attaching the magnet 236 to the superhard compact 202. It is noted that a magnetic field may be applied to the HPHT assembly during the HPHT process to prevent or reduce demagnetization and/or prevent dipoles of the magnet 236 for leaving their ordered arrangement. In an embodiment, the magnet 236 may be attached to the superhard compact 202 after the HPHT process using any of the attachment techniques disclosed herein.

In an embodiment, the magnet 236 may be formed in the superhard compact 202, thereby attaching the magnet 236 in the superhard compact 202. In such an embodiment, a plurality of ferromagnetic grains (e.g., samarium-cobalt grains, neodymium-iron-boron grains, etc.) are disposed in a recess defined by at least one of the superhard table 218, the substrate 224, or the grains used to form the superhard table 218. The plurality of ferromagnetic grains may then be processed to form the magnet 236 using a powder metallurgical process. For example, an isostatic or transverse press may apply a force to the ferromagnetic grains while, optionally, heating the ferromagnetic grains (e.g., in an HPHT process). An electric field may be applied to the ferromagnetic grains during the powder metallurgical process to orient the ferromagnetic grains.

In an embodiment, the magnet 236 may be magnetized after attaching the magnet 236 to the superhard compact. For instance, the magnet 236 may be provided in an unmagnetized state or the high temperatures used to attach the magnet 236 to the superhard compact 202 may at least partially demagnetize the magnet 236. The magnet 236 may be magnetized using any suitable method, such a polarity process. It is noted that magnetizing the magnet 236 may also cause magnetization of at least one of the superhard table 218 or the substrate 224 (e.g., magnetization of the metal-solvent catalyst in at least one of the superhard table 218 or the substrate 224). The magnetization of at least one of the superhard table 218 or the substrate 224 may improve attachment between the different components of the superhard compact 202 and between the superhard compact 202 and the support body.

Figure 3A:
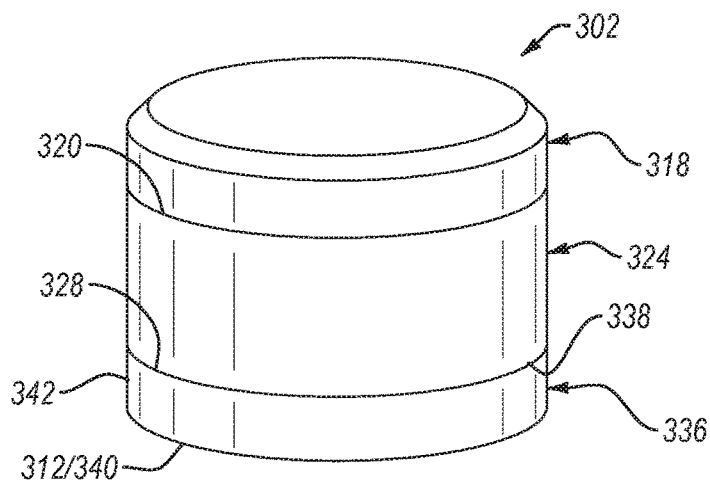
FIGS. 3A and 3B are isometric and exploded isometric views, respectively, of a superhard compact, according to an embodiment.
Figure 3B:
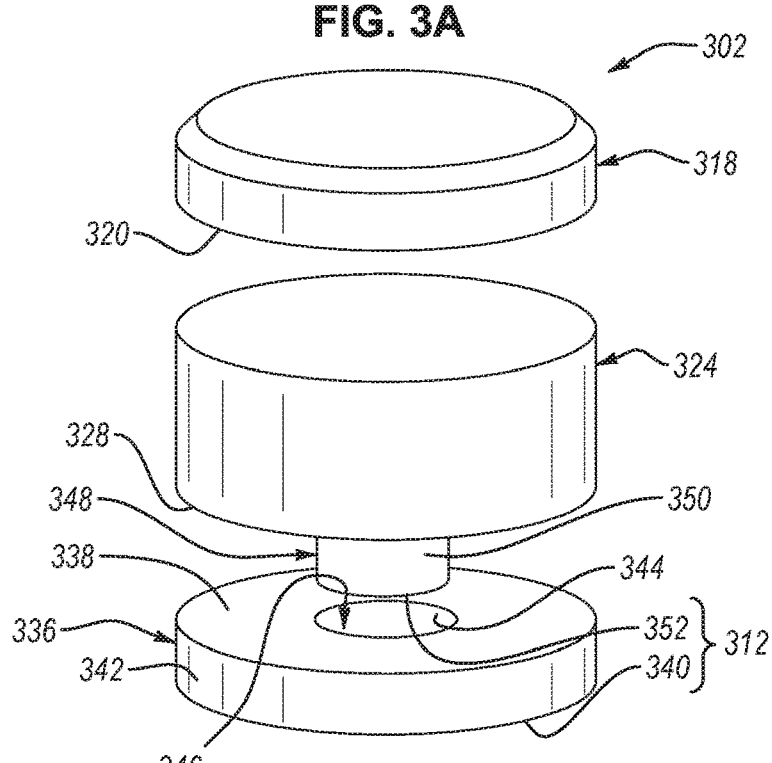
Figure 3C:
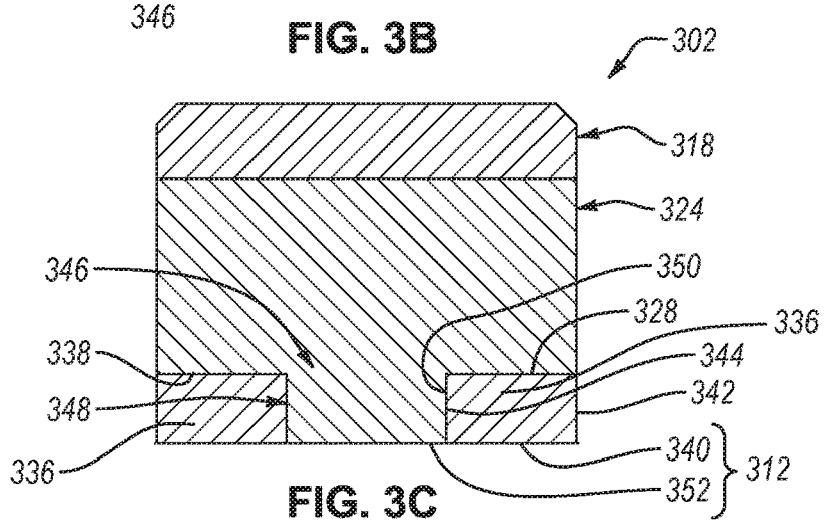
FIG. 3C is a cross-sectional view of the superhard compact shown in FIGS. 3A and 3B taken along line 3C-3C, according to an embodiment.

FIGS. 3A and 3B are isometric and exploded isometric views, respectively, of a superhard compact 302, according to an embodiment. FIG. 3C is a cross-sectional view of the superhard compact 302 shown in FIGS. 3A and 3B taken along line 3C-3C, according to an embodiment. Except as otherwise disclosed herein, the superhard compact 302 is the same or substantially similar to any of the superhard compacts disclosed herein. For example, the superhard compact 302 may include a superhard table 318, at least one magnet 336 attached (either directly or indirectly) to the superhard table 318, and, optionally, a substrate 324.

The magnet 336 defines a magnet upper surface 338, a magnet bottom surface 340, and at least one magnet outer lateral surface 342 extending between the magnet upper surface 338 and the magnet bottom surface 340. The magnet 336 also includes at least one magnet inner lateral surface 344 defining a hole 346. In the illustrated embodiment, the hole 346 extends completely through the magnet 336. In other words, the magnet inner lateral surface 344 extends between the magnet upper surface 338 and the magnet bottom surface 340. However, in an embodiment, the hole 346 only extends partially through the magnet 336 (i.e., in a blind hole). In such an embodiment, the magnet inner lateral surface 344 may extend from the magnet upper surface 338 to an intermediate surface (not shown) of the magnet 336 that is located between the magnet upper surface 338 and the magnet bottom surface 340.

The superhard compact 302 may define a protrusion 348. The protrusion 348 may be configured to be at least partially disposed in the hole 346 which may allow the protrusion 348 to correctly position the magnet 336 relative to the substrate bottom surface 328 and/or form an interference fit between the protrusion 348 and the magnet 336. The protrusion 348 may exhibit a shape that corresponds to the hole 346. For example, the protrusion 348 may include at least one protrusion lateral surface 350 that corresponds to the at least one magnet inner lateral surface 344 and a protrusion bottom surface 352. In an embodiment, when the magnet 336 is an electromagnet, the protrusion 348 may form a magnetic core of the electromagnet.

In an embodiment, as shown, the protrusion 348 may extend from the substrate bottom surface 328 (i.e., the protrusion lateral surface 350 may extend from the substrate bottom surface 328 to the protrusion bottom surface 352). In such an embodiment, the protrusion 348 may be integrally formed with the substrate 324 (as shown) or may be distinct from the substrate 324. When the protrusion 348 is distinct from the substrate 324, the protrusion 348 may be attached to the substrate bottom surface 328 using any suitable attachment technique, such as via brazing. In an embodiment, the substrate 324 may be omitted from the superhard compact 302. In such an embodiment, the protrusion 348 may extend from the table bottom surface 320 (i.e., the protrusion lateral surface 350 may extend from the table bottom surface 320 to the protrusion bottom surface 352) and the protrusion 348 may be integrally formed with or distinct from the superhard table 318. When the protrusion 348 is distinct from the superhard table 318, the protrusion 348 may be attached to the superhard table 318 using any suitable attachment technique, such as via brazing or a metallurgical bond.

The protrusion 348 may exhibit length that is measured from an uppermost portion of the protrusion 348 (e.g., the portion of the protrusion 348 adjacent to the table bottom surface 320 or the substrate bottom surface 328) to the protrusion bottom surface 352. The hole 346 also exhibits an axial length measured from the magnet upper surface 338 to either the magnet bottom surface 340 or the intermediate surface. In an embodiment, as shown, the axial length of the protrusion 348 is equal to or less than the axial length of the hole 346 which allows the protrusion 348 to be positioned within the hole 346. In such an embodiment, the magnet bottom surface 340 and, optionally, the protrusion bottom surface 352 (if the protrusion extends completely through the hole 346) forms the bottom surface 312 of the superhard compact 302. In an embodiment, when the hole 346 extends completely through the magnet 336, the axial length of the protrusion 348 may be greater than the axial length of the magnet 336. The increased axial length of the protrusion 348 relative to the axial length of the hole 346 may create an axial offset between the protrusion bottom surface 352 and the magnet bottom surface 340. The axial offset may cause a gap to exist between the magnet bottom surface 340 and the protrusion bottom surface 352 to form the bottom surface of the superhard compact 302.

When the protrusion 348 is integrally formed with the superhard table 318 or the substrate 324, the protrusion 348 may be formed using any suitable method. In an embodiment, the protrusion 348 is formed by removing a portion of the superhard compact 302 using grinding, lapping, electrical discharge machining, lasing, or by any other suitable method. In an embodiment, the protrusion 348 is formed using a sacrificial material during the formation of the superhard compact 302 (e.g., during the formation of the substrate 324 or during the HPHT process). For example, the sacrificial material may surround the protrusion. The sacrificial material may be selected to be easily removed from the superhard compact 302. In an embodiment, as previously discussed, the protrusion 348 may be attached to the superhard compact 302 via brazing, a metallurgical bond, or by any other suitable method.

Figure 4A:
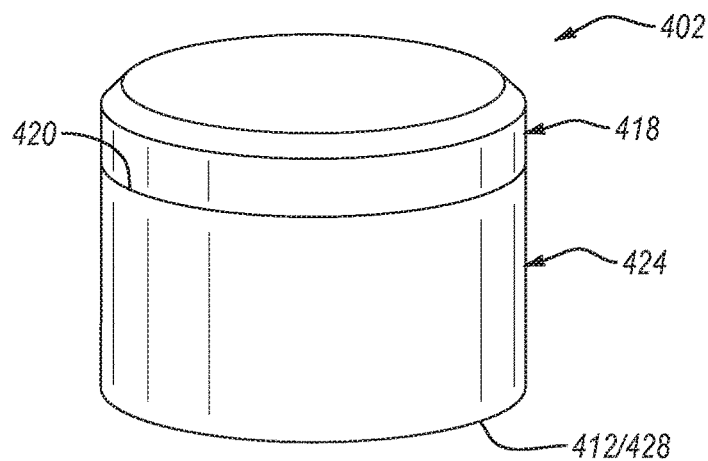
FIGS. 4A and 4B are isometric and exploded isometric views, respectively, of a superhard compact, according to an embodiment.
Figure 4B:
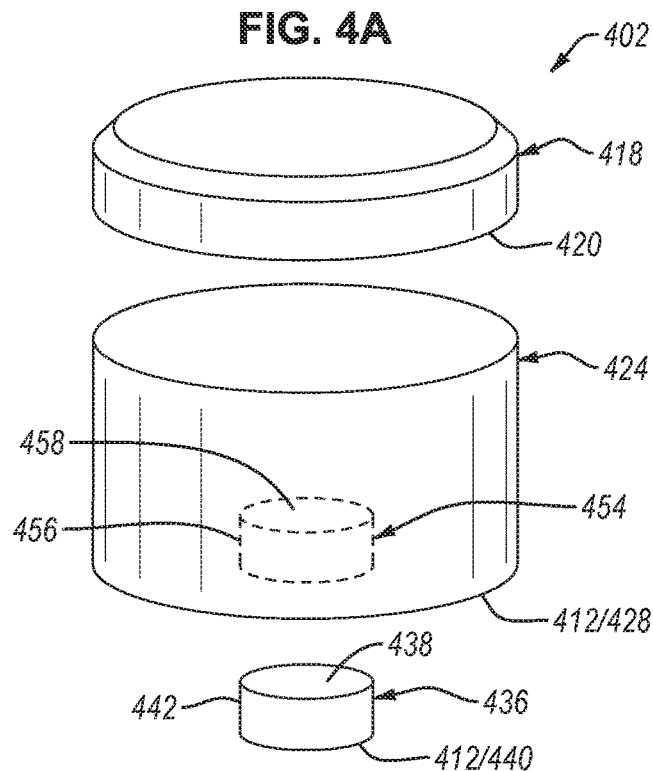
Figure 4C:
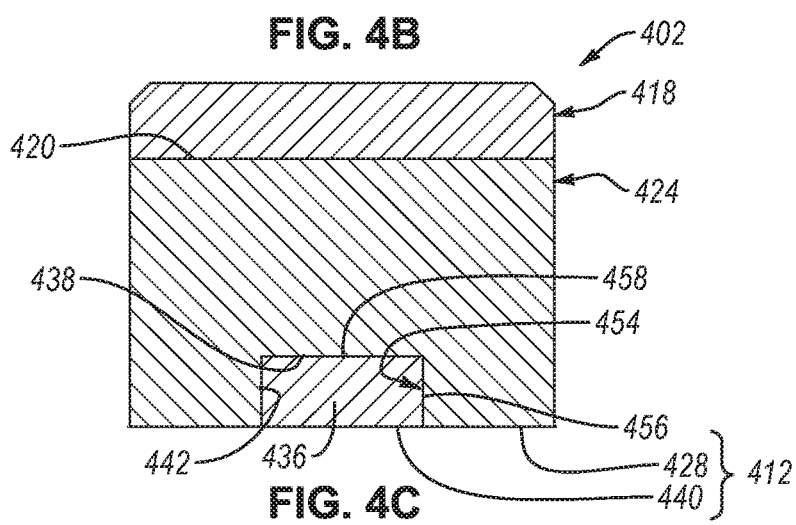
FIG. 4C is a cross-sectional view of the superhard compact shown in FIGS. 4A and 4B taken along line 4C-4C, according to an embodiment.

FIGS. 4A and 4B are isometric and exploded isometric views, respectively, of a superhard compact 402, according to an embodiment. FIG. 4C is a cross-sectional view of the superhard compact 402 shown in FIGS. 4A and 4B taken along line 4C-4C, according to an embodiment. Except as otherwise disclosed herein, the superhard compact 402 is the same or substantially similar to any of the superhard compacts disclosed herein. For example, the superhard compact 402 may include a superhard table 418, at least one magnet 436, and, optionally, a substrate 424.

As shown, the superhard compact 402 defines a compact recess 454 extending from a bottom surface 412 of the superhard compact 402. The compact recess 454 may be configured to receive a magnet 436. For instance, the compact recess 454 exhibits a shape that corresponds to the shape of the magnet 436. In an example, the compact recess 454 defines at least one compact recess lateral surface 456 and a compact recess upper surface 458 that corresponds to the at least one magnet lateral surface 442 and the magnet upper surface 438, respectively. In addition to receiving the magnet 436, the compact recess 454 may also be configured to attach the magnet 436 to the rest of the superhard compact 402 using any suitable attachment technique. For example, at least a portion the compact recess 454 may be brazed to the magnet 436 or interference fit with the magnet 436.

In an embodiment, when the superhard compact 402 includes the substrate 424, the compact recess 454 may be formed in at least the substrate 424. For example, the compact recess lateral surface 456 may extend from the substrate bottom surface 428 to the compact recess upper surface 458. In an embodiment, when the substrate 424 is omitted from the superhard compact 402, the compact recess 454 may be formed entirely in the superhard table 418. For example, the compact recess lateral surface 456 may extend from the table bottom surface 420 to the compact recess upper surface 458.

In an embodiment, the compact recess 454 may exhibit a length measured from the compact recess upper surface 458 to the bottommost portion of the compact recess 454 (e.g., to a portion of the compact recess 454 that intersects the table bottom surface 420 or the substrate bottom surface 428). The magnet 436 may also exhibit a length measured from the magnet upper surface 438 to the magnet bottom surface 440. In an embodiment, the length of the compact recess 454 is substantially the same as the length of the magnet 436. In such an embodiment, the magnet bottom surface 440 forms at least a portion of the bottom surface 412 of the superhard compact 402. In an embodiment, the length of the compact recess 454 is greater than the length of the magnet 436 such that an axial offset exists between the magnet bottom surface 422 and the bottom surface 412 of the superhard compact 502.

In an embodiment, as shown, the superhard compact 402 defines a single compact recess 454. However, it is noted that the superhard compact 402 may define a plurality of recesses, wherein each of the plurality of recesses is configured to receive a magnet.

The compact recess 454 may be formed in the superhard compact 402 using any suitable method. In an embodiment, the compact recess 454 is formed via grinding, electrical discharge machining, lasing, or any other suitable method. In an embodiment, the compact recess 454 is formed using a sacrificial material during the formation of the superhard compact 402.

In an embodiment, not shown, the centroid of the magnet 436 may be substantially positioned at the centroid of the superhard compact 402 (e.g., in the centroid of the substrate 424) such that the superhard compact 402 surrounds the magnet 436.

Figure 5A:
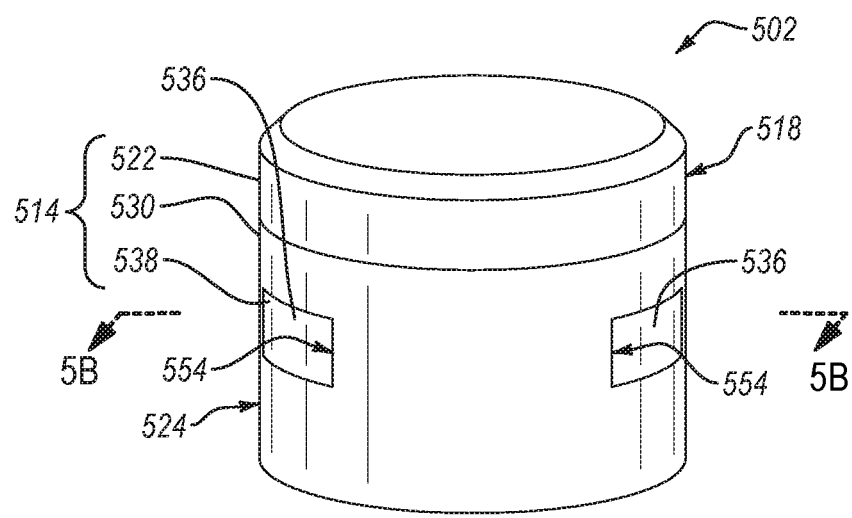
FIG. 5A is an isometric view of a superhard compact, according to an embodiment.
Figure 5B:
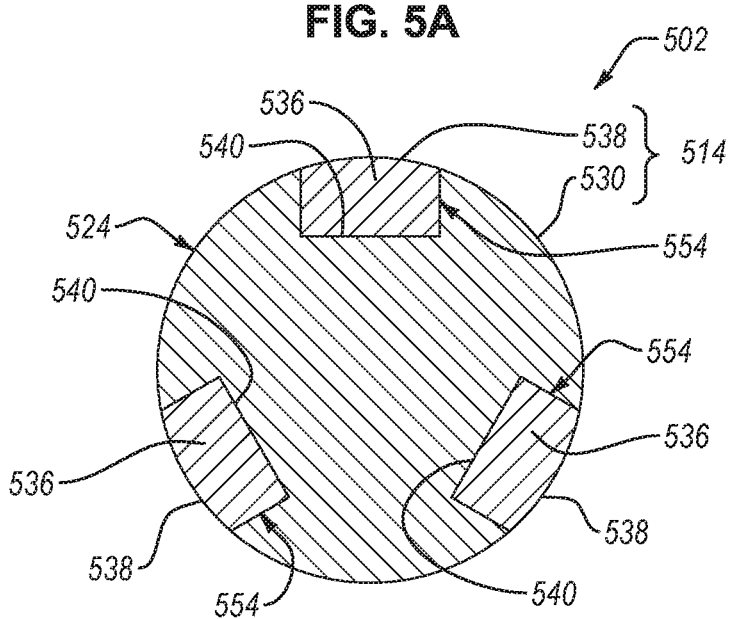
FIG. 5B is a cross-sectional view of the superhard compact shown in FIG. 5A taken along line 5B-5B, according to an embodiment.

The superhard compacts disclosed herein may define at least one compact recess extending inwardly from a lateral surface of the superhard compact instead of or in conjunction with at least one compact recess extending inwardly from a bottom surface. For example, FIG. 5A is an isometric view of a superhard compact 502, according to an embodiment. FIG. 5B is a cross-sectional view of the superhard compact 502 shown in FIG. 5A taken along line 5B-5B, according to an embodiment. Except as otherwise disclose herein, the superhard compact 502 may be the same or substantially similar to any of the superhard compacts disclosed herein. For example, the superhard compact 502 may include a superhard table 518, at least one magnet 536, and, optionally, a substrate 524. The superhard compact 502 also defines at least one compact recess 554 (e.g., a plurality of compact recesses 554) extending inwardly from at least one lateral surface 514 of the superhard compact 502 (e.g., at least one of the table lateral surface 522 or the substrate lateral surface 530).

The compact recess 554 exhibits a shape that corresponds to the shape of the magnet 536 such that the magnet 536 may be disposed in the compact recess 554. For example, in the illustrated embodiment, the magnet 536 exhibits a generally rectangular parallelepiped shape (e.g., a rectangular parallelepiped including one surface curved to match the generally cylindrical shape of the superhard compact 502). However, it is noted that the magnet 536 and the compact recess 554 may exhibit any suitable shape, without limitation. The magnet 536 may be attached to the compact recess 554 using any suitable attachment technique, such as via brazing or an interference fit.

As previously discussed, the compact recess 554 extend inwardly from a lateral surface of the superhard compact 502. In an embodiment, when the superhard compact 502 includes the substrate 524, the compact recess 554 extends inwardly from at least the substrate lateral surface 530 since the substrate lateral surface 530 may be positioned adjacent to a support body (not shown). In an embodiment, if the substrate 524 is omitted from the superhard compact 502, the compact recess 554 may extend inwardly from the table lateral surface 522.

The compact recess 554 extends inwardly from the lateral surface 530 for a selected depth. The magnet 536 may also exhibit a length measured from an outermost surface 538 to an innermost surface 540 of the magnet 536. In an embodiment, the depth of the compact recess 554 is the same as the length of the magnet 536 such that the outermost surface 538 of the magnet 536 is flush with the lateral surface 514 of the superhard compact 502. In an embodiment, the depth of the compact recess 554 is greater than the length of the magnet 536 such that the outermost surface 538 of the magnet 536 is laterally offset (e.g., inwardly) from the lateral surface 514 of the superhard compact 502.

The superhard compact 502 may include any suitable number of recesses formed therein. In an embodiment, the superhard compact 502 may define a single compact recess 554, for example, when only a portion of the lateral surface 514 of the superhard compact 502 is covered by the support body during operation. In an embodiment, the superhard compact 502 may include a plurality of compact recesses 554 (even when only one side of the lateral surface 514 of the superhard compact 502 is covered by the support body) which may improve the strength of any attachment between the superhard compact 502 and the support body. In such an embodiment, the superhard compact 502 may include 2, 3, 4, 5, 6, 7, 8, 9, 10 or more compact recesses 554, or in ranges of about 2 to 4, 3 to 5, 5 to 6, 5 to 7, 6 to 8, 7 to 9, or 8 to 10 compact recesses 554. Regardless of the number of compact recesses 554, the compact recesses 554 may be equidistantly spaced from one another (e.g., along the circumference of the superhard compact 502) such that the attachment force between the superhard compact 502 and the support body remains equal around the superhard compact 502. However, it is noted that the compact recesses 554 may not be equidistantly spaced, for example, if higher forces are expected to be applied to a certain region of the superhard compact 502. When the superhard compact 502 includes a plurality of compact recesses 554, each of the compact recesses 554 may be formed in a single row (as shown) or may be arranged in a plurality of rows.

In an embodiment, instead of including a plurality of compact recesses, the superhard compact 502 may include a single annular compact recess that extends circumferentially about the superhard compact 502. In such an embodiment, the magnet 536 may include a single annular magnet or a plurality of magnets, wherein each magnet of the plurality of magnets is a portion of an annular shape.

Figure 6A:
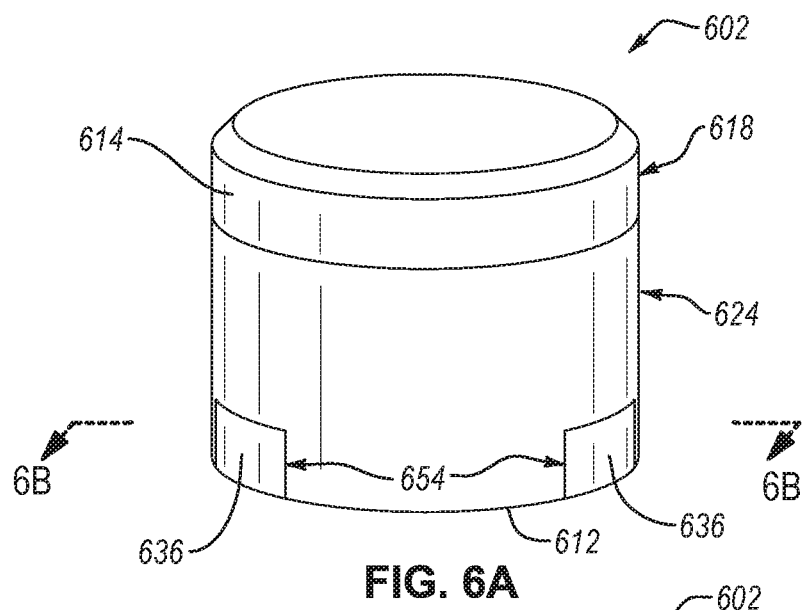
FIG. 6A is an isometric view of a superabrasive compact, according to an embodiment.
Figure 6B:
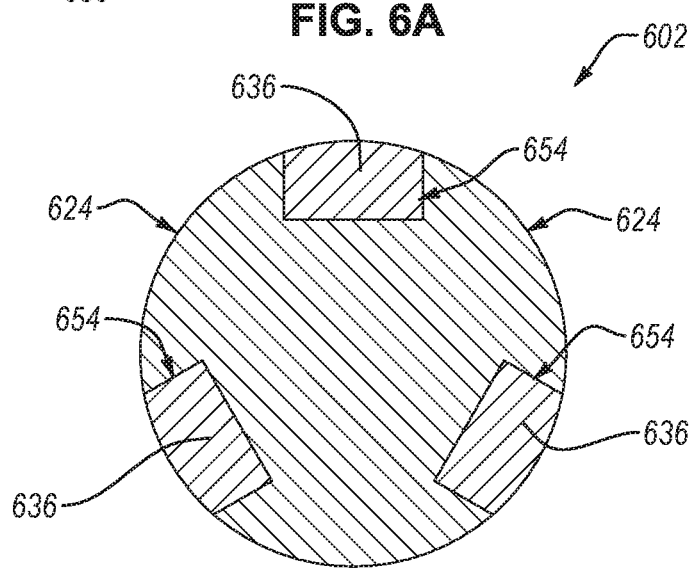
FIG. 6B is a cross-sectional view taken along line 6B-6B shown in FIG. 6A, according to an embodiment.

In an embodiment, the at least one compact recess may extend inwardly from both the bottom surface and the lateral surface of any of the superhard compacts disclosed herein. For example, FIG. 6A is an isometric view of a superabrasive compact 602, according to an embodiment. FIG. 6B is a cross-sectional view taken along line 6B-6B shown in FIG. 6A, according to an embodiment. Except as otherwise disclosed herein, the superhard compact 602 may be the same or substantially similar to any of the superhard compacts disclosed herein. For example, the superhard compact 602 may include a superhard table 618, at least one magnet 636, and, optionally, a substrate 624. The superhard compact 602 also includes at least one compact recess 654 extending inwardly from the bottom surface 612 of the superhard compact 602 and the lateral surface 614 of the superhard compact 602. The compact recess 654 may exhibit a shape that corresponds to the shape of the magnet 636 such that the magnet 636 may be disposed in the compact recess 654.

In an embodiment, as previously discussed, the compact recess 654 may exhibit a size that is substantially the same as the size of the magnet 636 such that the magnet 636 defines part of the bottom surface 612 and the lateral surface 614 of the superhard compact 602. In an embodiment, as previously discussed, the compact recess 654 may exhibit a size that is greater than the size of the magnet 636 such that the magnet 636 exhibits at least one of an axial offset relative to the bottom surface 612 of the superhard compact 636 or a lateral offset relative to the lateral surface 614 of the superhard compact 602.

It is noted that any of the superhard compacts disclosed herein may include combinations of magnets and/or the arrangements of the magnets disclosed herein. In an example, a superhard compact may include the magnet 236 shown in FIGS. 2A-2C and define one or more compact recesses therein that each include another magnet disposed therein, as shown in FIGS. 3A-5B. In an example, the superhard compact may define a compact recess that is configured to receive a magnet defining a hollowed region. In such an example, the compact recess may include a protrusion that corresponds to the hollowed region.

Figure 7A:
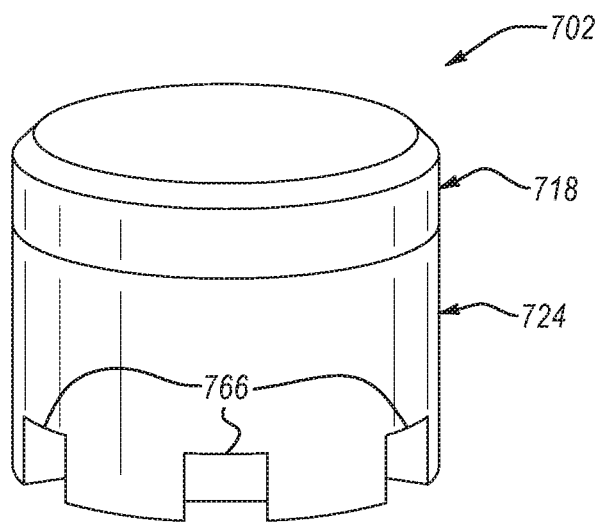
FIGS. 7A and 7B are schematic isometric and cross-sectional views of a superhard compact, according to an embodiment.
Figure 7B:
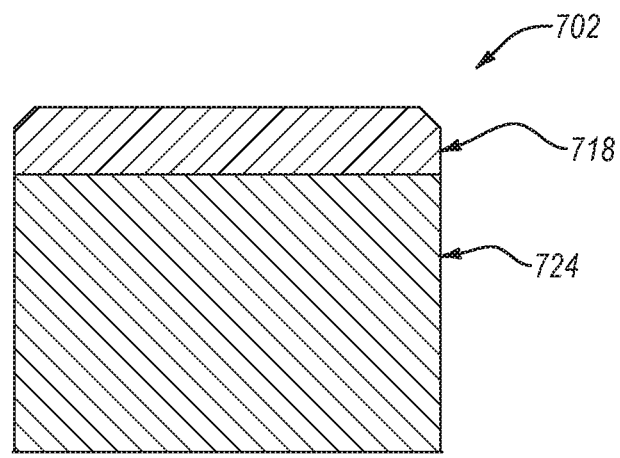

In some embodiments, the superhard compacts disclosed herein do not include a magnet that is distinct from the superhard table and/or the substrate. For example, FIGS. 7A and 7B are schematic isometric and cross-sectional views of a superhard compact 702, according to an embodiment. Except as otherwise disclosed herein, the superhard compact 702 may be the same or substantially similar to any of the superhard compacts disclosed herein. For example, the superhard compact 702 includes a superhard table 718 and, optionally, a substrate 724. However, the superhard compact 702 does not include at least one magnet that is distinct from the superhard table 718 and the substrate 724.

In an embodiment, the superhard compact 702 may not include a distinct magnet because the support body to which the superhard compact 702 is secured includes at least one magnet (as discussed in more detail below). In such an embodiment, the superhard compact 702 includes a ferromagnetic material that magnetically attaches the superhard compact 702 to the magnet of the support body. For example, the superhard compact 702 may include a ferromagnetic material (not shown) that is distinct from the superhard table 718 and the substrate 724 or at least one of the superhard table 718 or the substrate 724 include the ferromagnetic material (e.g., one or more metal-solvent catalysts). In an embodiment, at least one of the superhard table 718 or the substrate 724 may be magnetically attracted and, thus, the superhard compact 702 may not need a magnet that is distinct from the superhard table 718 and the substrate 724. For example, as previously discussed, at least one of the superhard table 718 or the substrate 724 may include a ferromagnetic material, such as a metal-solvent catalyst. The ferromagnetic material may be magnetized using any suitable method and the magnetized ferromagnetic material may be used to secure the superhard compact 702 to the support body. For example, the superhard compact 702 may be a PDC including a PCD table bonded to a cobalt-cemented tungsten carbide substrate. In such an example, the cobalt of the cobalt-cemented tungsten carbide substrate and cobalt in the PCD table may be magnetized since cobalt is a ferromagnetic material.

Figure 8:
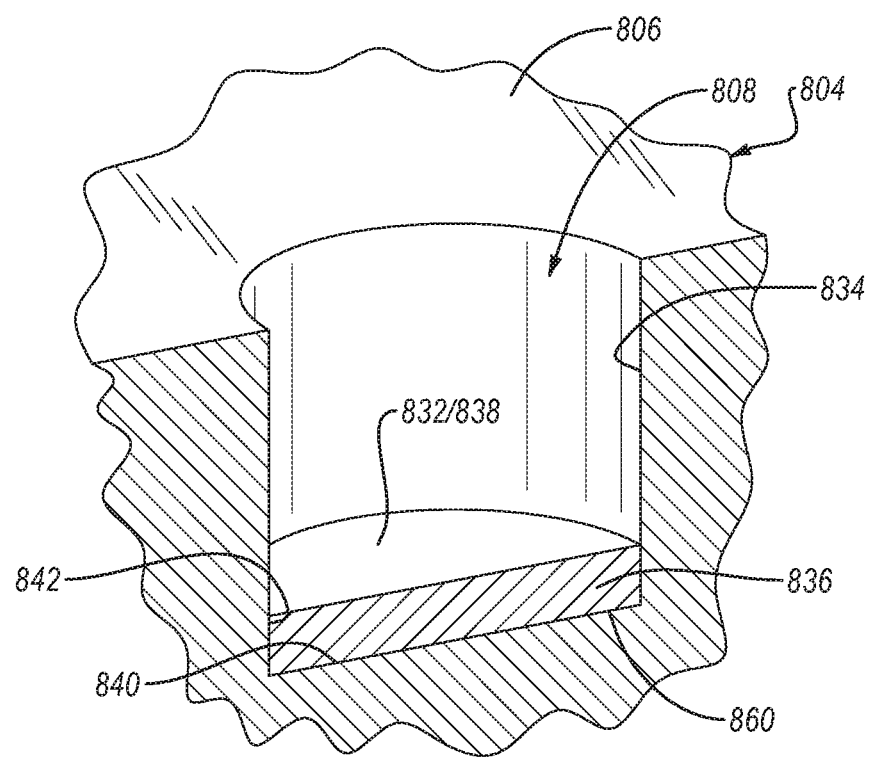
FIG. 8 is a partial cross-sectional view of a support body, according to an embodiment.

As previously discussed, the support body may include at least one magnet (e.g., the magnet may be attached to, disposed in, or incorporated into the support body). Optionally, the superhard compact may also include at least one magnet or may not include at least one magnet. FIG. 8 is a partial cross-sectional view of a support body 804 (e.g., partially cross-sectional view of a bit blade and cutter pocket), according to an embodiment. Except as otherwise disclosed herein, the support body 804 may be the same or substantially similar to any of the support bodies disclosed herein. For example, the support body 804 may include at least one exterior surface 806 and at least one recess 808 (e.g., a plurality of recesses) extending inwardly from the exterior surface 806. The recess 808 is configured to receive at least a portion of any of the superhard compact embodiments disclosed herein.

The recess 808 is defined by a base surface 860 that is spaced from the exterior surface 806 of the support body 804 and at least one recess lateral surface 834 extending between the exterior surface 806 to the base surface 860. As previously discussed, the recess lateral surface 834 may exhibit a size and shape that corresponds to the size and shape of at least one compact lateral surface of a superhard compact positioned at least partially within the recess 808. However, the recess lateral surface 834 may be sized such that a gap to exists between the compact lateral surface of the superhard compact and the recess lateral surface 834.

The support body 804 includes at least one magnet 836 that is attached to the support body 804 (e.g., at or near the lowermost portion of the recess 808 or at or near the base surface 860). For example, in the illustrated embodiment, magnet 836 is defined by a magnet upper surface 838, a magnet bottom surface 840 opposite the magnet upper surface 838, and at least one magnet lateral surface 842 extending between the magnet upper surface 838 and the magnet bottom surface 840. The magnet upper surface 838 may define the recess bottom surface 832 and may be configured to abut or be adjacent to the bottom surface of the superhard compact that is received in the recess 808. As such, the magnet upper surface 838 may exhibit a shape that corresponds to the shape of the bottom surface of the superhard compact to distribute forces applied to the magnet upper surface 838 thereby decreasing the probability that the magnet 836 would be damaged. The magnet bottom surface 840 may be configured to abut the base surface 860. The magnet bottom surface 840 may exhibit a shape that corresponds to the shape of the base surface 860 to better distribute any load applied thereto and to facilitate attachment of the magnet bottom surface 840 to the base surface 860. The magnet lateral surface 842 may exhibit a shape that corresponds to the recess lateral surface 834 or may exhibit a shape that is different than the recess lateral surface 834.

The magnet 836 may be attached to the support body 804 using any suitable attachment technique. For example, at least one of the magnet bottom surface 840 or the magnet lateral surface 842 may be attached (e.g., via brazing, interference fit, etc.) to the base surface 860 or the magnet lateral surface 842, respectively. The magnet 836 may be attached to the rest of the support body 804 before, during, or after the formation of the support body 804.

Figure 9:
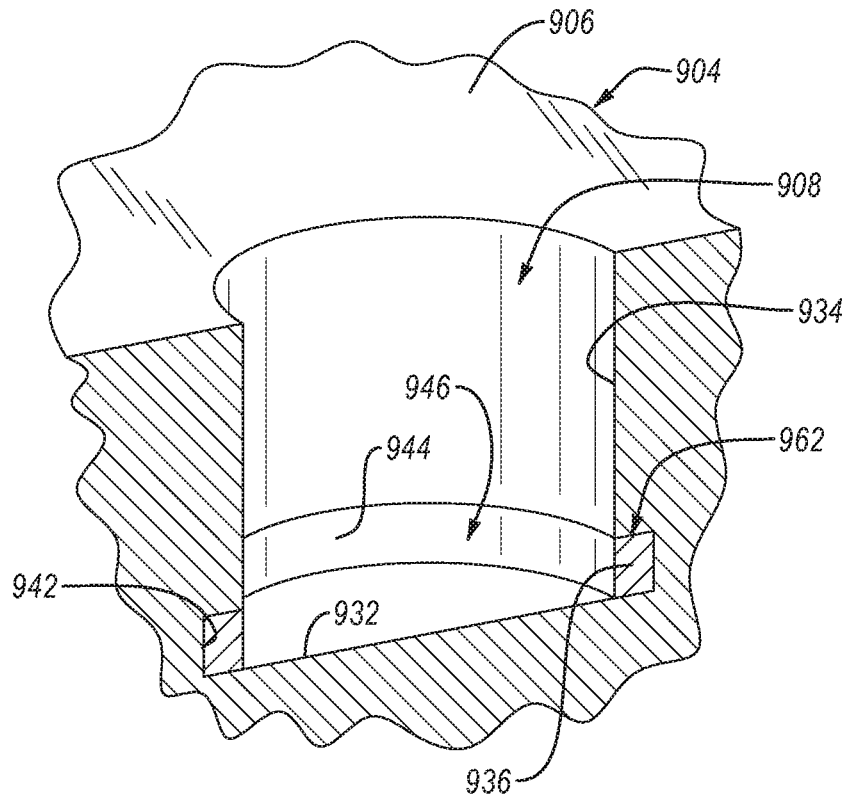
FIG. 9 is a partial cross-sectional view of a support body, according to an embodiment.

FIG. 9 is a partial cross-sectional view of a support body 904, according to an embodiment. Except as otherwise disclosed herein, the support body 904 may be the same or substantially similar to any of the support bodies disclosed herein. For example, the support body 904 may include at least one exterior surface 906 and at least one recess 908 extending inwardly from the exterior surface 906. The recess 908 may be defined by a recess bottom surface 932 and at least one recess lateral surface 934 extending between the exterior surface 906 to the recess bottom surface 932. The recess 908 may be configured to receive at least a portion of a superhard compact therein.

The support body 904 also defines an annular recess 962 extending radially outwardly from the recess lateral surface 934. In an embodiment, as illustrated, the annular recess 962 is adjacent to the recess bottom surface 932. In an embodiment, the annular recess 962 may be spaced from the recess bottom surface 932 (e.g., at a location between the exterior surface 906 and the recess bottom surface 932). The location of the annular recess 962 relative to the recess bottom surface 932 may depend on the location of a magnet or a non-magnetized ferromagnetic material comprising the superhard compact that is received by the recess 908.

The annular recess 962 is configured to receive at least one magnet 936. In an embodiment, as illustrated, the annular recess 962 exhibits an annular shape including an inner lateral surface 944 that defines a groove 946. The magnet 936 may comprise a single magnet or a plurality of magnets. Similar to the magnet 336 of FIGS. 3A-3C, the inner lateral surface 944 and the groove 946 may extend completely along the magnet 936 or only partially along the magnet 936. The groove 946 may be shaped and sized to surround at least a portion of the superhard compact. For example, the inner lateral surface 944 and the groove 946 may be sized and shaped to correspond to the size and shape of the lateral surface of the superhard compact or may be sized and shape to correspond to the size and shape of a protrusion extending from the superhard compact (e.g., similar to the protrusion 348 shown in FIGS. 3B and 3C).

The annular recess 962 exhibits a depth measured radially outwardly from the recess lateral surface 934 and the magnet 936 may exhibit a width measured from the inner lateral surface 944 to an outer lateral surface 942. In an embodiment, the depth of the annular recess 962 is less than the width of the magnet 936. In such an embodiment, the magnet 936 may protrude from the recess lateral surface 934 and the inner lateral surface 944 and the groove 946 may be configured to only receive a protrusion of the superhard compact, as discussed above. In an embodiment, the depth of the annular recess 962 is substantially equal to the width of the magnet 936. In such an embodiment, the inner lateral surface 944 may form part of the recess lateral surface 934. In an embodiment, the depth of the annular recess 962 is greater than the width of the magnet 936. In such an embodiment, the inner lateral surface 944 may be laterally offset from the recess lateral surface 934.

Figure 10A:
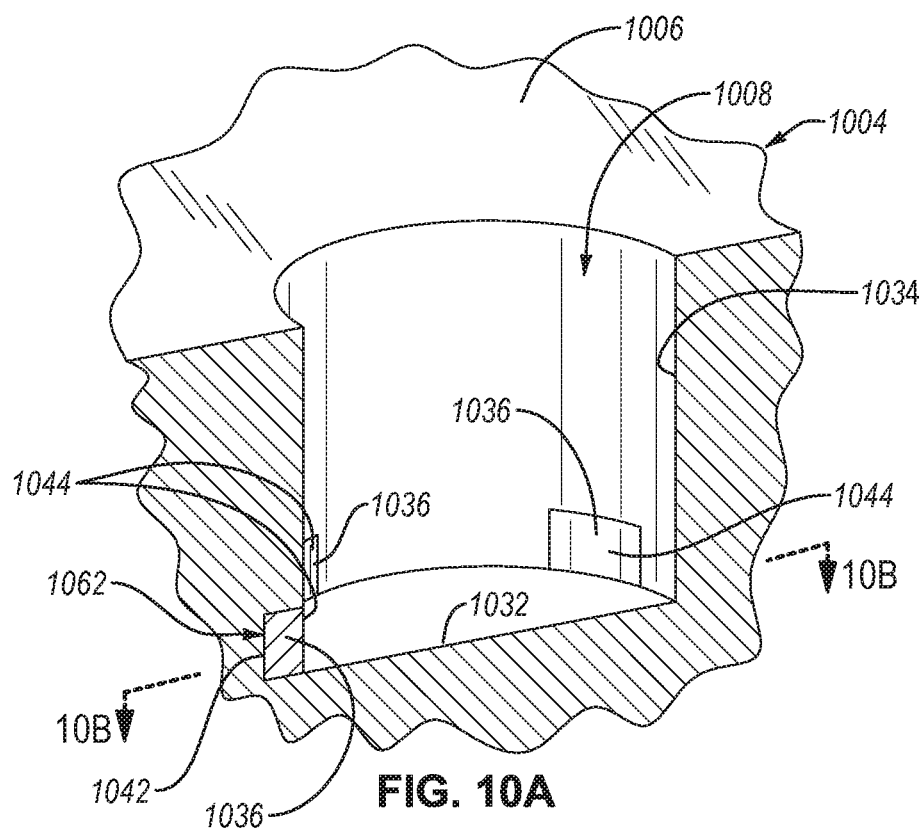
FIG. 10A is a partially cross-sectional view of a support body, according to an embodiment.
Figure 10B:
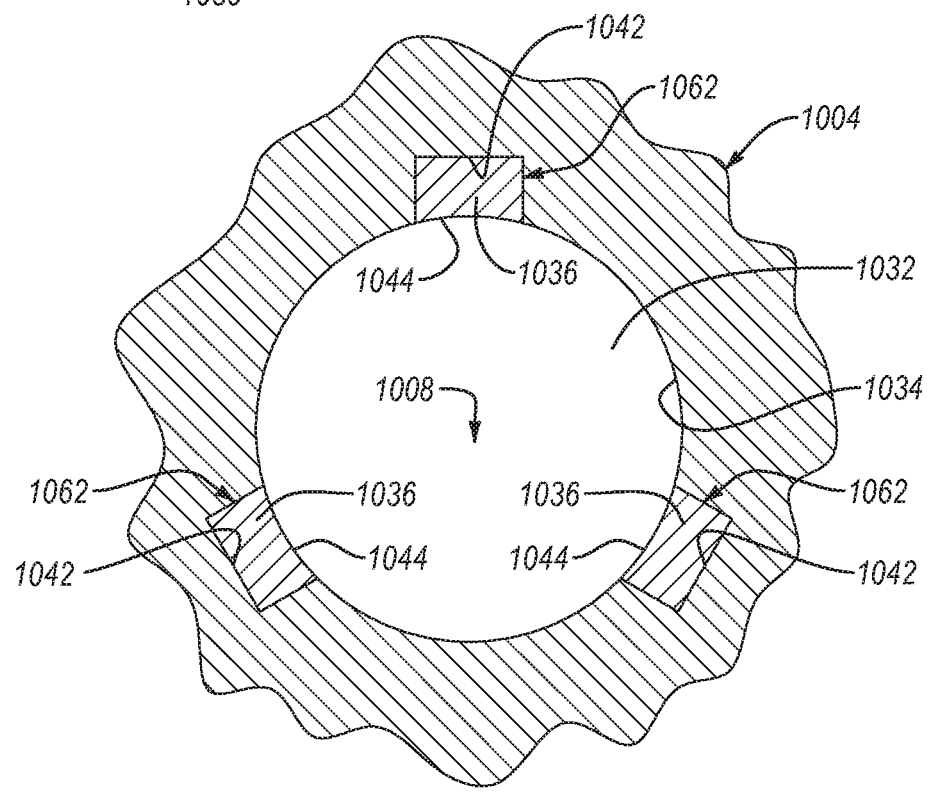
FIG. 10B is a cross-sectional view of the support body shown in FIG. 10A taken along line 10B-10B, according to an embodiment.

FIG. 10A is a partially cross-sectional view of a support body 1004, according to an embodiment. FIG. 10B is a cross-sectional view of the support body 1004 shown in FIG. 10A taken along line 10B-10B, according to an embodiment. Except as otherwise disclosed herein, the support body 1004 may be the same or substantially similar to any of the support bodies disclosed herein. For example, the support body 1004 may include at least one exterior surface 1006 and at least one recess 1008 extending inwardly from the exterior surface 1006. The recess 1008 is defined by a recess bottom surface 1032 and at least one recess lateral surface 1034. The recess 1008 is configured to receive at least a portion of any of the superhard compacts disclosed herein.

The support body 1004 also includes at least one (e.g., a plurality of) additional recess 1062 extending radially outwardly from the recess 1008. Similar to the annular recess 962 of FIG. 9, the recess 1062 may be positioned adjacent to the recess bottom surface 1032 or may be spaced from the recess bottom surface 1032.

The support body 1004 also includes at least one magnet 1036. The magnet 1036 and the additional recess 1062 are each sized and shaped such that the magnet 1036 may be positioned in and secured its associated the additional recess 1062 using any suitable attachment mechanism. The additional recess 1062 may exhibit a depth measured radially outwardly from the recess lateral surface 1034 and the magnet 1036 may exhibit a width measured from an inner surface 1044 to an opposing outer surface 1042. In an embodiment, the depth of the additional recess 1062 is less than the width of the magnet 1036. In such an embodiment, the magnet 1036 may protrude from the recess lateral surface 1034 and may be used, for example, when the superhard compact includes a protrusion or when the superhard compact defines one or more recesses (e.g., recesses 766 of FIG. 7A, as will be discussed in more detail below). In an embodiment, the radial depth of the additional recess 1062 is substantially equal to the radial width of the magnet 1036. In such an embodiment, the inner surface 1044 of the magnet 1036 forms part of the recess lateral surface 1034. In an embodiment, the depth of the additional recess 1062 is greater than the width of the magnet 1036. In such an embodiment, the outer surface 1042 of the magnet 1036 is laterally offset relative to the recess lateral surface 1034.

The support body 1004 may include any suitable number of additional recesses 1062 formed therein. In an embodiment, the support body 1004 may define a single additional recess 1062, for example, when only one portion of the lateral surface of the superhard compact is covered by the support body 1004. In an embodiment, the support body 1004 may include a plurality of additional recesses 1062 (even when only a portion of the lateral surface of the superhard compact is covered by the support body 1004), which may improve the strength of any attachment between the superhard compact and the support body 1004. In such an embodiment, the support body 1004 may include 2, 3, 4, 5, 6, 7, 8, 9, 10 or more additional recesses 1062, or in ranges of about 2 to 4, 3 to 5, 5 to 6, 5 to 7, 6 to 8, 7 to 9, or 8 to 10 additional recesses 1062. Regardless of the number of additional recesses 1062, the additional recesses 1062 may be equidistantly spaced from one another such that the attachment strength between the superhard compact and the support body 1004 remains substantially equal around the superhard compact. However, it is note that the additional recesses 1062 may not be equidistantly spaced, for example, when a different forces are expected to be applied to different regions of the superhard compact. When the support body 1004 includes a plurality of additional recesses 1062, each of the additional recesses 1062 may be formed in a single row (as shown) or may be arranged in a plurality of rows.

In an embodiment, the support body 1004 is configured to be used with one of the superhard compact 502 or the superhard compact 602 of FIGS. 5A-6B. For example, the additional recess 1062 may be positioned to be adjacent to the magnets of the superhard compact 502 or the superhard compact 602 when the superhard compact 502 or the superhard compact 602 is positioned in the recess 1008. The support body 1004 may include the same number of magnets 1036 as the superhard compact 502 or the superhard compact 602. Such an arrangement may inhibit incidental rotation of the superhard compacts 502 or 602. Further, such an arrangement may allow for controlled rotation of the superhard compact 502 or the superhard compact 602 at preset increments (e.g., when the assembly is repaired). In an embodiment, the support body 1004 may be used with any of the superhard compacts disclosed herein.

Figure 11:
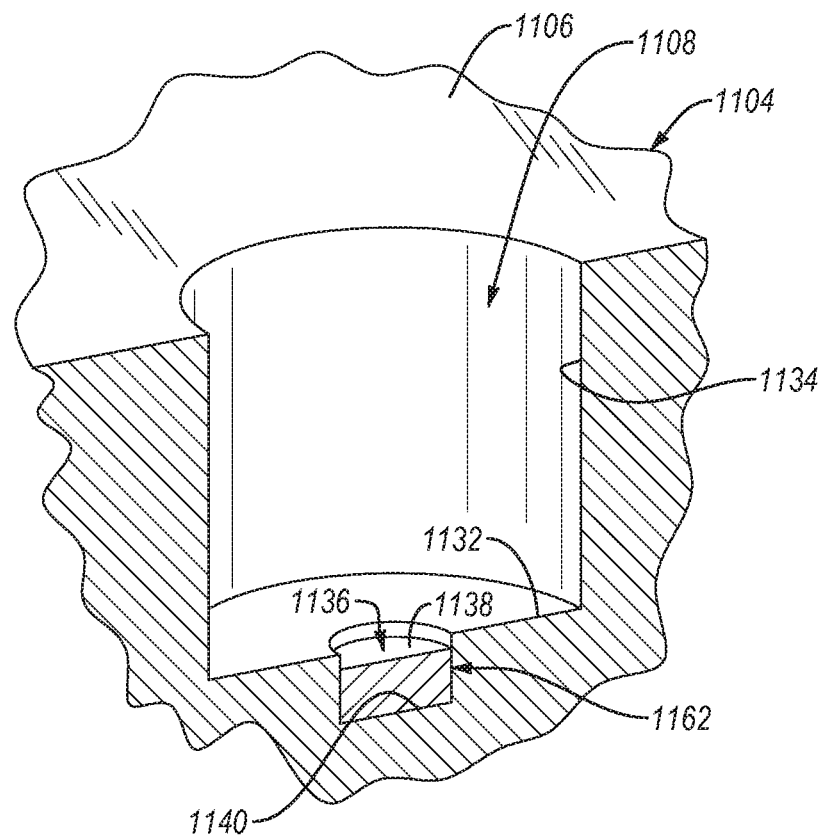
FIG. 11 is a partial cross-sectional view of a support body, according to an embodiment.

FIG. 11 is a partial cross-sectional view of a support body 1104, according to an embodiment. Except as otherwise disclosed herein, the support body 1104 may be the same or substantially similar to any of the support bodies disclosed herein. For example, the support body 1104 may include at least one exterior surface 1106 and at least one recess 1108 extending inwardly from the exterior surface 1106. The recess 1108 defines a recess bottom surface 1132 and at least one recess lateral surface 1134 that may extend from the exterior surface 1106 to the recess bottom surface 1132. The recess 1108 is configured to receive at least a portion of any of the superhard compacts disclosed herein.

The support body 1104 defines at least one additional recess 1162 extending inwardly from the recess bottom surface 1132. The support body 1104 may also include at least one magnet 1136. The additional recess 1162 and the magnet 1136 each exhibit a size and shape that allows the magnet 1136 to be disposed in the additional recess 1162. The magnet 1136 may be secured in the additional recess 1162 using any suitable attachment technique.

The additional recess 1162 exhibits a depth measured from the recess bottom surface 1132 to an opposing portion of the additional recess 1162 and the magnet 1136 exhibits a length measured from the magnet upper surface 1138 to a magnet lower surface 1140. In an embodiment, the depth of the additional recess 1162 is equal to the length of the magnet 1136. In such an embodiment, the magnet upper surface 1138 may form part of the recess bottom surface 1132. In an embodiment, as illustrated, the depth of the additional recess 1162 is greater than the length of the magnet 1136. In such an embodiment, the magnet upper surface 1138 is axially offset relative to the recess bottom surface 1132.

Figure 12:
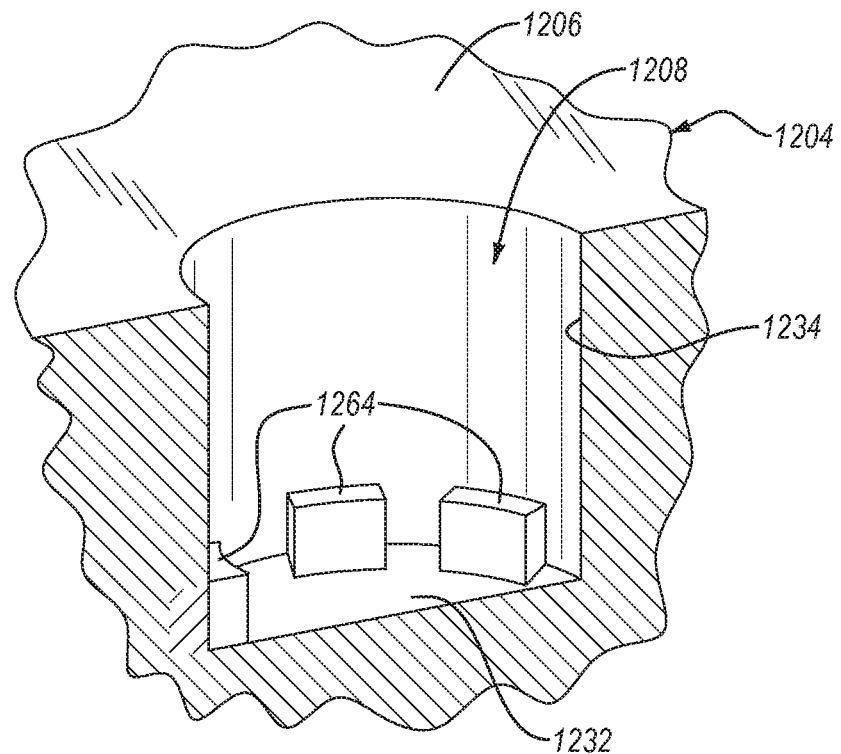
FIG. 12 is a partial cross-sectional view of a support body that does not include a magnet that is distinct from the rest of the support body, according to an embodiment.

In some embodiments, the support body may not include at least one magnet that is distinct from the rest of the support body (e.g., the rest of the support body is the magnet or the support body does not include a magnet). For example, FIG. 12 is a partial cross-sectional view of a support body 1204 that does not include a magnet that is distinct from the rest of the support body 1204, according to an embodiment. Except as otherwise disclosed herein, the support body 1204 may be the same or substantially similar to any of the support bodies disclosed herein. For example, the support body 1204 may include at least one exterior surface 1206 and at least one recess 1208 defined by a recess bottom surface 1232 and at least one recess lateral surface 1234. The support body 1204 may be used with any of the superhard compacts disclosed herein.

In an embodiment, the support body 1204 does not include a magnet because the superhard compact that is secured to the support body 1204 includes at least one magnet. In such an embodiment, the support body 1204 includes a ferromagnetic material that magnetically attaches the magnet of the superhard compact to the support body 1204. For example, the support body 1204 may include a ferromagnetic material (not shown) that is distinct from the support body 1204 or the support body 1204 may be at least partially formed from a ferromagnetic material. Such a ferromagnetic material may be magnetized using any suitable method and the magnetized ferromagnetic material may be used to secure the superhard compact to the support body 1204. Thus, in such an embodiment, the support body 1204 does not include a magnet that is distinct from the rest of the support body 1204 since at least a portion of the support body 1204 itself is magnetic.

The superhard compacts illustrated in FIGS. 1A-7B are illustrated as exhibiting a generally cylindrical shape. The generally cylindrical shape of the superhard compacts may allow the superhard compacts to selectively be rotated, freely rotated, or substantially freely rotate in the recesses disclosed herein. Allowing the superhard compacts to rotate in the recesses may allow the superhard compacts to wear substantially uniformly on the upper surfaces hereof. However, in some embodiments, it may be beneficial or desirable to inhibit rotation of the superhard compacts. The superhard compacts may be prevented from rotating using any suitable technique. In an embodiment, rotation of the superhard compacts may be prevented by forming the superhard compacts to exhibit non-cylindrical shapes. Examples of non-cylindrical shapes that the superhard compacts may exhibit includes the shapes illustrated in FIGS. 14A and 15A after the superhard compacts illustrated therein are cut, a shape exhibiting a generally rectangular cross-sectional shape, a shape exhibiting a generally truncated pie-like shape, or any other suitable shape. In an embodiment, FIGS. 7 and 12 illustrate another technique for preventing incidental rotations of the superhard compact 702 in the recess 1208. For example, the support body 1204 may include one or more protrusions 1264 extending outwardly from at least one of the recess bottom surface 1232 or the recess lateral surface 1234. The superhard compact 708 may define one or more cutouts 766 formed therein corresponding to the protrusions 1264. The cutouts 766 may exhibit a size and shape that allows the protrusions 1264 to be received in the cutouts 766. Positioning the protrusions 1264 in the cutouts 766 may prevent rotation of the superhard compacts 702 in the recess 1208. Further, the protrusions 1264 and the cutouts 766 may only allow intentional or selective rotation of the superhard compact 702 in the recess 1208 (e.g., when the assembly including the superhard compact 702 and the support body 1204) in pre-selected rotations. In one embodiment, the pre-selected rotations may be selected such that any failed portion of the superhard compact 702 is unlikely to adversely affect the operation of the assembly after rotation of the superhard compact 702. It is noted that any of the superhard compacts and support bodies disclosed herein may include recesses and/or protrusions, respectively, without limitation. In an embodiment, the protrusions 1264 may be magnets.

Figure 13A:
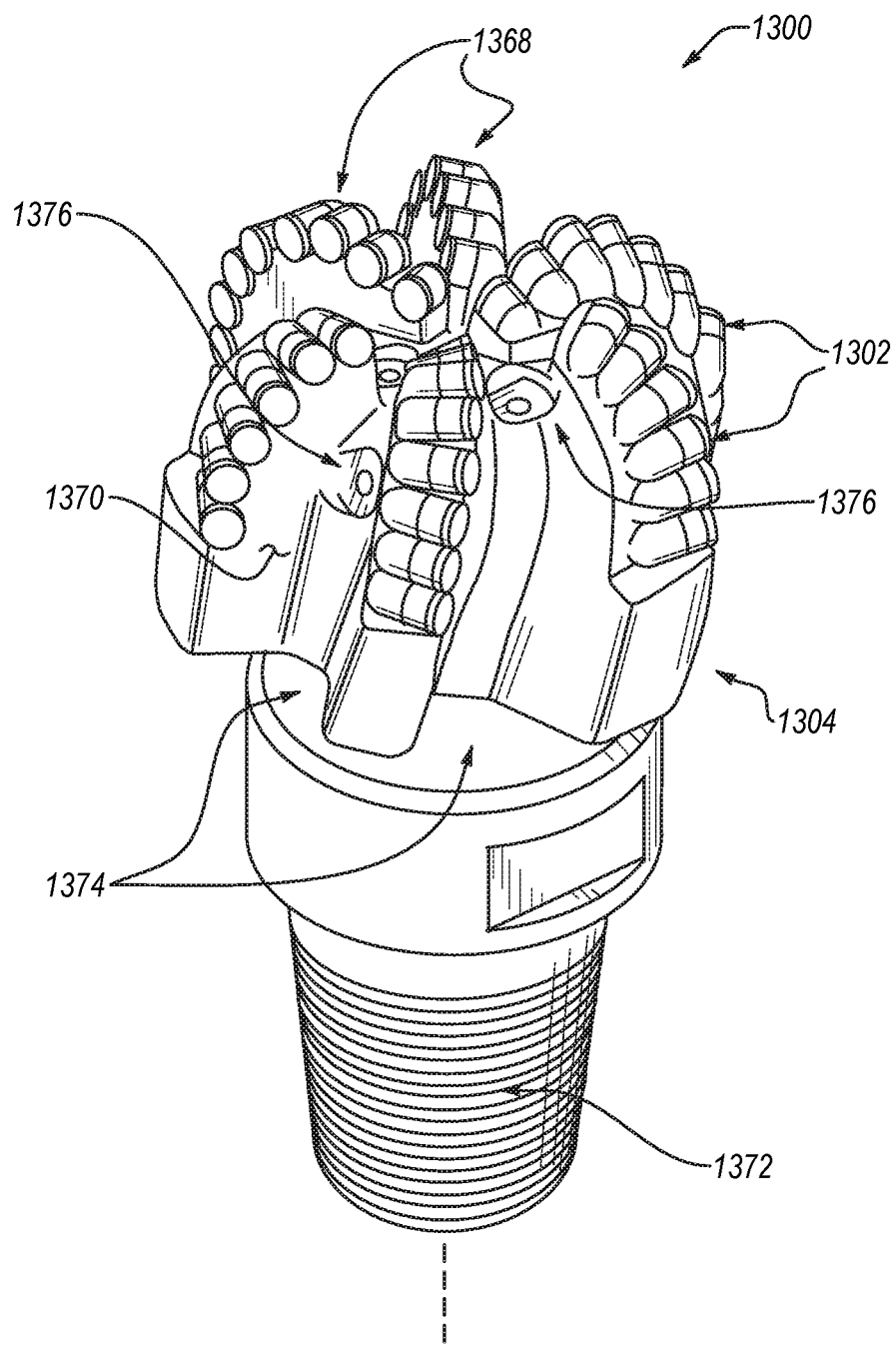
FIGS. 13A and 13B are isometric and top plan views, respectively, of an embodiment of a rotary drill bit for use in subterranean drilling applications, according to an embodiment.
Figure 13B:
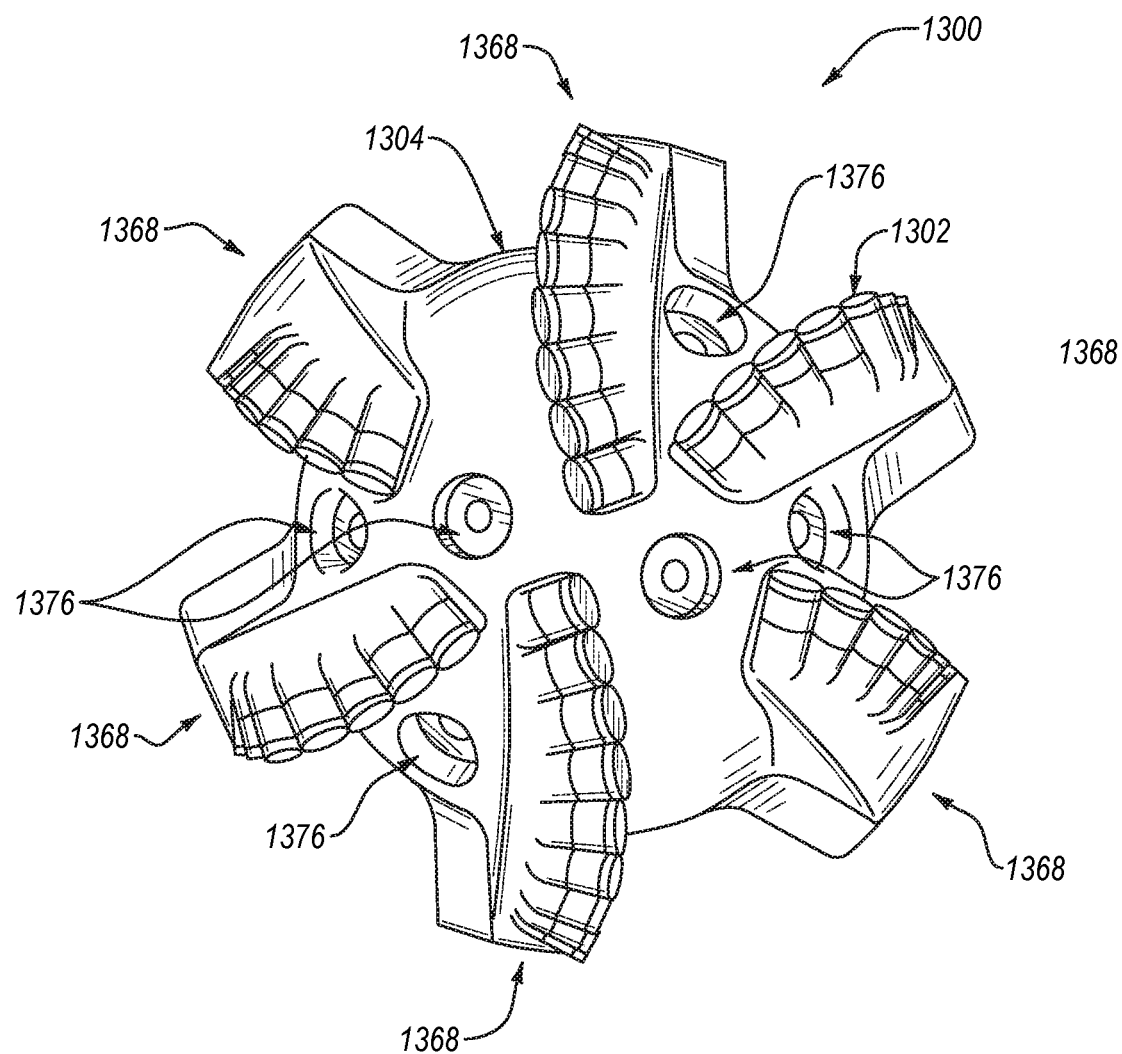

As previously discussed, the assemblies disclosed herein may include a drill bit. FIGS. 13A and 13B are isometric and top plan views, respectively, of an embodiment of a rotary drill bit 1300 for use in subterranean drilling applications, such as oil and gas exploration, according to an embodiment. The rotary drill bit 1300 comprises a bit body 1304. The bit body 1304 may include any of the support bodies disclosed herein. The bit body 1304 includes radially and longitudinally extending blades 1368 with leading faces 1370, and a threaded pin connection 1372 for connecting the bit body 1304 to a drilling string. The bit body 1304 defines a leading end structure for drilling into a subterranean formation by rotation about a longitudinal axis and application of weight-on-bit. At least one superhard compact 1302 (e.g., superhard cutting element), configured according to any of the previously described superhard compact embodiments, may be affixed magnetically to the bit body 1304.

With reference to FIG. 13B, at least one of a plurality of superhard compacts 1302 are secured to the blades 1368 using at least one magnet (not shown) that forms part of at least one of the superhard compact 1302 or the bit body 1304. In addition, if desired, in some embodiments, at least one of the superhard compacts 1302 may be secured to the bit body 1304 using conventional attachment techniques, such as brazing or press-fitting, instead of using at least one magnet. Also, circumferentially adjacent blades 1368 define so-called junk slots 1374 therebetween, as known in the art. Additionally, the rotary drill bit 1300 may include a plurality of nozzle cavities 1376 for communicating drilling fluid from the interior of the rotary drill bit 1300 to the superhard compacts 1302.

The rotary drill bit 1300 may then be used in one or more subterranean drilling operations until at least one of the plurality of superhard compacts 1302 fail (e.g., spall). Failure of the superhard compacts 1302 may be detected by sudden changes in force exerted by the plurality of superhard compacts 1302 against a subterranean surface, visual inspection, audible cues, or combinations thereof. After one or more superhard compacts 1302 wear, the worn superhard compacts 1302 may be at least one of rotated relative to the rotatory drill bit 1300; removed from the rotary drill bit 1300; or replaced. For example, the failed superhard compacts 1302 may be rotated relative to the rotary drill bit 1300 to position the failed superhard compacts 1302 such that a non-failed portion of the superhard compact 1302 is in a cutting position.

FIGS. 13A and 13B merely depict one embodiment of a rotary drill bit 1300 that employs at least one PDC fabricated and structured in accordance with the disclosed embodiments, without limitation. The rotary drill bit 1300 is used to represent any number of earth-boring tools or drilling tools, including, for example, core bits, roller-cone bits, fixed-cutter bits, eccentric bits, bi-center bits, reamers, reamer wings, or any other downhole tool including superhard compacts, without limitation.

One issue with superhard compacts that are used in drill bits is that only a portion of the upper surface of the superhard compacts contact the subterranean surface. For example, only about one quarter to one third of the upper surface of the superhard compact may contact the subterranean surface and/or exhibit substantial wear. As such, typically, only a portion of the upper surface of the superhard compacts are affected when the superhard compact wears. Due to the high cost of the superhard compacts, wear of the superhard compact may merely result in the superhard compact being rotated such that another portion of the upper surface that is not affected by the wear of the superhard compact contacts the subterranean surface.

Figure 14A:
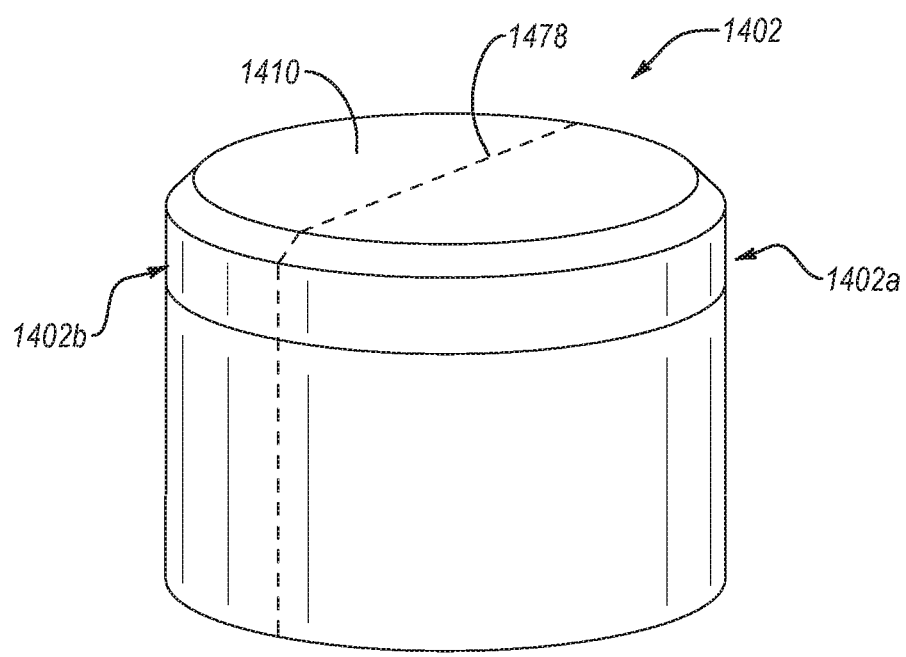
FIG. 14A is an isometric view of a superhard compact, according to an embodiment.

To decrease the cost of using the superhard compacts disclosed herein, the superhard compacts may exhibit a size or shape such that all or substantially all of the upper surface of the superhard compact cuts the subterranean surface. For example, FIG. 14A is an isometric view of a superhard compact 1402, according to an embodiment. The superhard compact 1402 may be the same or substantially similar to any of the superhard compacts disclosed herein. Further, the superhard compact 1402 is illustrated as exhibiting a generally cylindrical shape because, in some embodiments, cylindrically shaped superhard compacts may be at least one of easier to form and/or more commonly used. However, it is noted that the superhard compact 1402 may exhibit any suitable shape. Particularly, any of the disclosed embodiments may use, employ, or incorporate, at least one of non-cylindrical or partially cylindrical superhard compacts The superhard compact 1402 may be used in a drilling application where only about half of the upper surface 1410 is exposed to the subterranean surface. As such, the superhard compact 1402 may be cut in half (the cut 1478 is shown with the dashed line) to form two superhard compacts 1402a and 1402b. The cut 1478 may be formed using any suitable method, such as electrical discharge machining or lasing. Forming the superhard compact 1402 into two superhard compacts 1402a, 1402b may allow the superhard compact 1402 to exhibit the same benefits as rotating a superhard compact (e.g., provide two distinct cutting surfaces). Similar to the other superhard compacts disclosed herein, the at least one magnet may be used to secure each of the two superhard compacts 1402, 1402b to a support body and may allow the removal and replacement of the two superhard compacts 1402a, 1402b in the field.

Figure 14B:
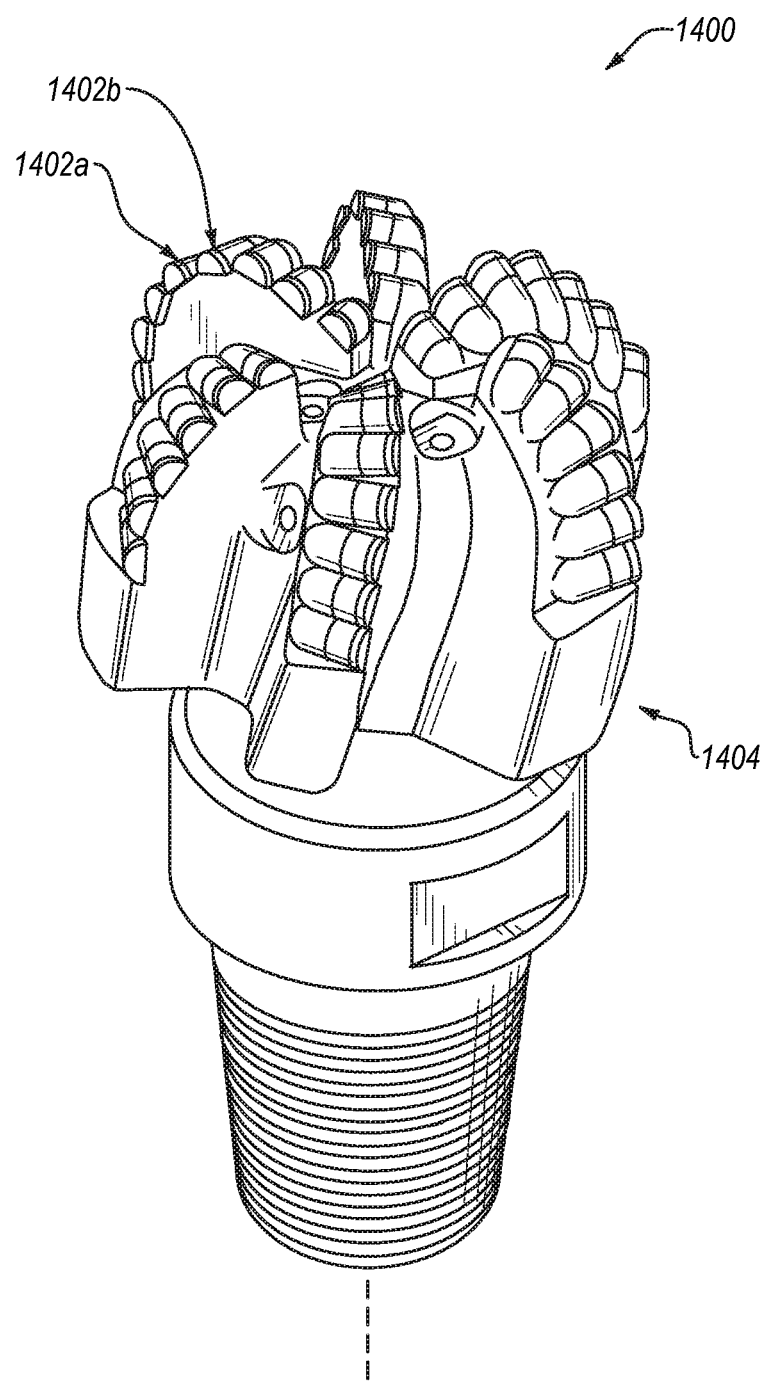
FIG. 14B is an isometric view of a rotary drill bit, according to an embodiment.

At least one of the superhard compacts 1402a, 1402b may be used with a drill bit that is configured to receive at least one of superhard compacts 1402a, 1402b (e.g., cylindrical superhard compacts). For example, FIG. 14B is an isometric view of a rotary drill bit 1400, according to an embodiment. The rotary drill bit 1400 includes a bit body 1404 and a plurality of superhard compacts (e.g., superhard compact 1402a, 1402b). The bit body 1404 may define recesses (not shown) exhibiting a generally partially cylindrical shape configured to allow the recesses to receive and secure the superhard compacts therein.

Figure 15A:
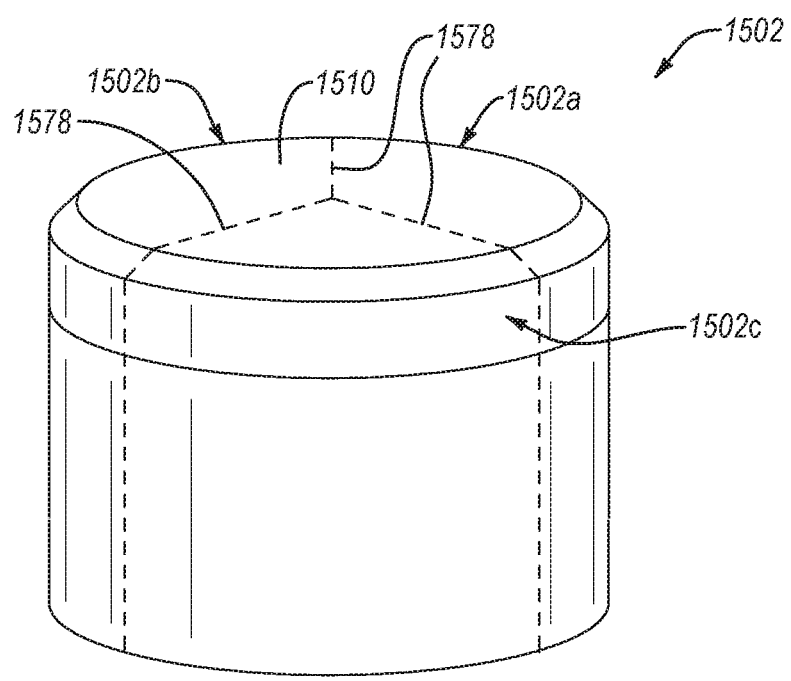
FIG. 15A is an isometric view of a superhard compact, according to an embodiment.

In another example, FIG. 15A is an isometric view of a superhard compact 1502, according to an embodiment. Except as otherwise disclosed herein, the superhard compact 1502 is the same or substantially similar to any of the superhard compacts disclosed here, such as the same or substantially similar to the superhard compact 1402 of FIG. 14A. The superhard compact 1502 is configured to be used in drill bit embodiments where a portion of the upper surface 1510 of the superhard compact 1502 contacts, cuts, and wears against a subterranean surface. As such, the superhard compact 1502 is cut (the cut 1578 is shown with a dashed line) into three superhard compacts 1502a, 1502b, and 1502c using any of the cutting methods disclosed herein.

Figure 15B:
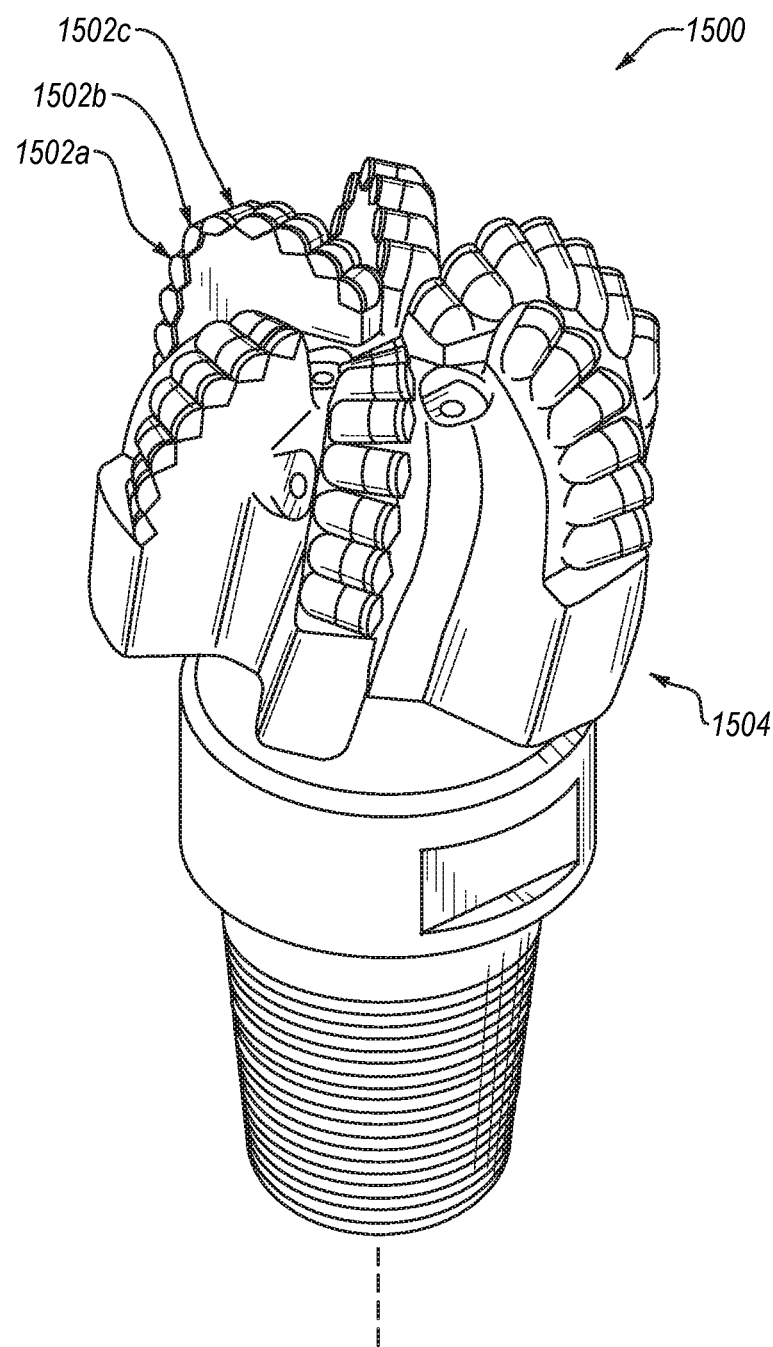
FIG. 15B is an isometric view of a rotary drill bit, according to an embodiment.

The superhard compacts 1502a, 1502b, 1502c may be used with a drill bit that is configured to receive the three superhard compacts 1502a, 1502b, 1502c (e.g., generally triangular-cylindrical segment shaped superhard compacts). For example, FIG. 15B is an isometric view of a rotary drill bit 1500, according to an embodiment. The rotary drill bit 1500 includes a bit body 1504 and a plurality of superhard compacts (e.g., superhard compact 1502a, 1502b, 1502c). The bit body 1504 may define recesses (not shown) exhibiting a generally triangular-cylindrical segment shape that allows the recesses to receive and secure the superhard compacts therein.

Figure 16:
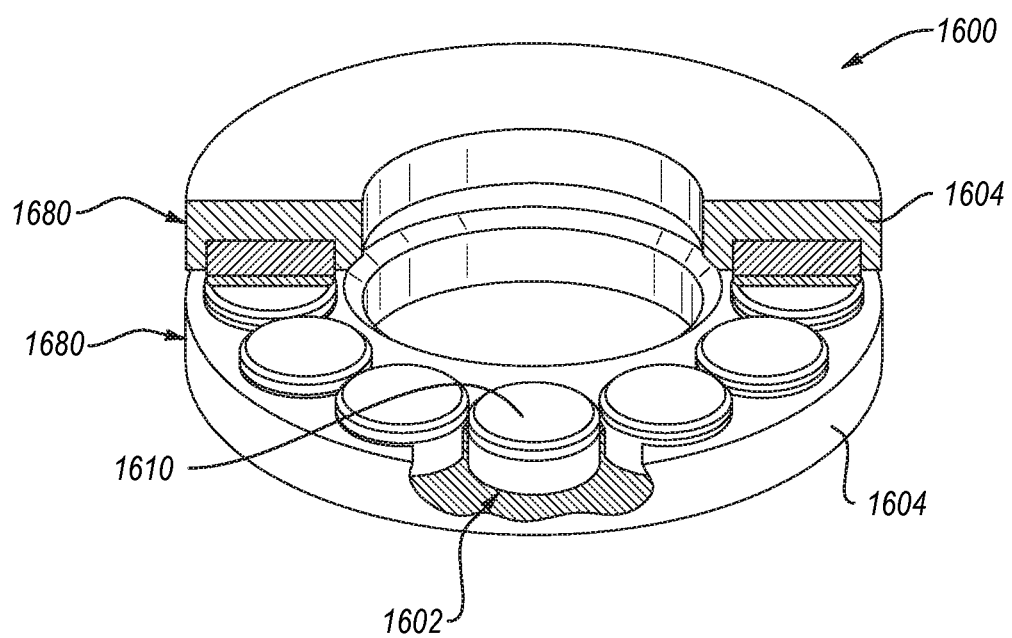
FIG. 16 is an isometric cutaway view of an embodiment of a thrust-bearing apparatus, according to an embodiment.

As previously discussed, the assemblies disclosed herein may be bearing apparatus/assembly. FIG. 16 is an isometric cutaway view of an embodiment of a thrust-bearing apparatus 1600, according to an embodiment. The thrust-bearing apparatus 1600 includes respective thrust-bearing assemblies 1680. Each thrust-bearing assembly 1680 includes an support ring 1604 that is the same as, substantially similar to, or may comprise any of the support bodies disclosed herein. Each support ring 1604 includes a plurality of recesses (not labeled), each of which receives a corresponding superhard compact 1602. At least one of the superhard compacts 1602 may be the same or substantially similar to any of the superhard compacts disclosed herein. At least one of the superhard compacts 1602 may be mounted to a corresponding support ring 1604 within a corresponding recess using at least one magnet (not shown). However, it is noted that at least one of the superhard compacts 1602 may be secured to the support ring 1604 using conventional attachment techniques, such as brazing or press-fitting.

In use, the bearing surfaces 1610 (e.g., the upper surface) of one of the thrust-bearing assemblies 1680 bear against the opposing bearing surfaces 1610 of the other one of the bearing assemblies 1680. For example, one of the thrust-bearing assemblies 1680 may be operably coupled to a shaft to rotate therewith and may be termed a "rotor." The other one of the thrust-bearing assemblies 1610 may be held stationary and may be termed a "stator."

It is noted that the assemblies, superhard compacts, and/or support bodies disclosed herein may be used in embodiments other that drill bits and thrust-bearing apparatuses/assemblies. In an example, the assemblies, superhard compacts, and/or support bodies disclosed herein may be used in radial bearing apparatuses/assemblies, examples of which are disclosed in U.S. Pat. No. 9,702,401 filed on Aug. 13, 2015, U.S. Pat. No. 10,371,204 filed on Feb. 8, 2017, and U.S. Pat. No. 7,901,137 filed on Jan. 11, 2008, the disclosure of each of which is incorporated herein, in its entirety, by this reference. In an example, the assemblies, superhard compacts, and/or support bodies disclosed herein may be used in bearing assemblies of subterranean drilling systems, wire-drawing die, artificial joints, heat sinks, friction stir welding tools, or any other suitable application.

While various aspects and embodiments have been disclosed herein, other aspects and embodiments are contemplated. The various aspects and embodiments disclosed herein are for purposes of illustration and are not intended to be limiting.

Terms of degree (e.g., "about," "substantially," "generally," etc.) indicate structurally or functionally insignificant variations. In an example, when the term of degree is included with a term indicating quantity, the term of degree is interpreted to mean ±10%, ±5%, +2% or 0% of the term indicating quantity. In an example, when the term of degree is used to modify a shape, the term of degree indicates that the shape being modified by the term of degree has a similar appearance of the disclosed shape. For instance, the term of degree may be used to indicate that the shape may have rounded corners instead of sharp corners, curved edges instead of straight edges, one or more protrusions extending therefrom, is oblong, is the same as the disclosed shape, etc. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A superhard compact for use in a support body, comprising:
   a superhard table including:
      an upper surface;
      a table bottom surface opposite the upper surface; and
      at least one table lateral surface extending between the upper surface and the table bottom surface;
   a substrate, the substrate including:
      an upper substrate surface bonded to the table bottom surface;
      a substrate bottom surface opposite the upper substrate surface; and
      at least one substrate lateral surface extending between the upper substrate surface and the substrate bottom surface; and at least one magnet configured to attach the superhard table to the support body, wherein a lateral surface of the at least one magnet is aligned with a lateral surface of the superhard table.

2. The superhard compact of claim 1 wherein the superhard table includes a polycrystalline diamond table, the polycrystalline diamond table including a plurality of diamond grains bonded together defining a plurality of interstitial regions therebetween, at least a portion of the plurality of interstitial regions including a metal-solvent catalyst therein.

3. The superhard compact of claim 2, wherein the substrate is directly attached to the at least one magnet and positioned between the superhard table and the at least one magnet.

4. The superhard compact of claim 1, wherein:
the at least one magnet includes a magnet upper surface that exhibits a shape that corresponds to the substrate bottom surface; and
the magnet upper surface is attached to the substrate bottom surface.

5. The superhard compact of claim 1, wherein the substrate defines at least one compact recess extending inwardly from the at least one substrate lateral surface, and wherein the at least one magnet is disposed in the at least one recess.

6. The superhard compact of claim 1, wherein the at least one magnet is brazed or press-fitted to the substrate.

7. An assembly, comprising:
a support body including at least one exterior surface and defining at least one recess, the recess defined by a recess bottom surface and at least one recess lateral surface extending between the recess bottom surface to the at least one exterior surface;
at least one superhard compact at least partially disposed in the at least one recess, the at least one superhard compact including a superhard table, the superhard table including an upper surface, a table bottom surface opposite the upper surface, and at least one table lateral surface extending between the upper surface and the table bottom surface; and
wherein:
the support body, the at least one superhard compact, or both comprise at least one magnet securing the at least one superhard compact to the support body;
the support body defines an annular recess extending outwardly from the at least one recess lateral surface; and
the at least one magnet at least partially disposed in the annular recess, the at least one magnet including at least one inner lateral surface defining a hollowed region configured to receive a portion of the superhard compact.

8. The assembly of claim 7 wherein the support body is a bit body or a bearing ring.

9. The assembly of claim 7 wherein the at least one superhard compact exhibits a cylindrical segment shape.

10. The assembly of claim 7 wherein the at least one magnet is attached to the recess bottom surface.

11. The assembly of claim 7 wherein:
the support body defines a plurality of additional recesses extending radially outwardly from the at least one recess lateral surface; and
the at least one magnet includes a plurality of magnets, each of the plurality of magnets are disposed in and attached to a corresponding one of the additional recesses.

12. The assembly of claim 11 wherein at least one of the plurality of magnets includes an inner surface is laterally offset relative to the at least one recess lateral surface.

13. The assembly of claim 7 wherein:
the support body defines at least one additional recess extending from the recess bottom surface away from the at least one exterior surface of the support body; and
the at least one magnet is at least partially disposed in the at least one additional recess.

14. The assembly of claim 7 wherein the at least one magnet comprises a permanent magnet or an electromagnet.

15. The assembly of claim 7 wherein the at least one magnet includes a plurality of magnets, at least one of the plurality of magnets is attached to the support body and at least one other of the plurality of magnets is attached to the at least one superhard compact.

16. A method of forming an assembly, the method comprising:
disposing the at least one superhard compact of claim 1 in at least one recess defined by the support body;
magnetically securing the at least one superhard compact to the support body.

17. An assembly, comprising:
a support body including at least one exterior surface and defining at least one recess, the recess defined by a recess bottom surface and at least one recess lateral surface extending between the recess bottom surface to the at least one exterior surface; and
at least one superhard compact at least partially disposed in the at least one recess, the at least one superhard compact including a superhard table, the superhard table including an upper surface, a table bottom surface opposite the upper surface, and at least one table lateral surface extending between the upper surface and the table bottom surface;
wherein the support body, the at least one superhard compact, or both comprise at least one magnet securing the at least one superhard compact to the support body, and wherein a lateral dimension of the superhard table of the at least one superhard compact is substantially the same as a lateral dimension of the at least one magnet; and
wherein the at least one magnet is configured to inhibit rotation of the at least one superhard compact relative to the support body.

18. The assembly of claim 17, wherein the at least one superhard compact comprises a substrate, and wherein the lateral dimension of the at least one superhard compact is substantially the same as a lateral dimension of the substrate.

* * * * *